(12) United States Patent
Maekawa

(10) Patent No.: US 8,434,872 B2
(45) Date of Patent: May 7, 2013

(54) MULTI-VIEWPOINT FLOATING IMAGE DISPLAY DEVICE

(75) Inventor: Satoshi Maekawa, Tokyo (JP)

(73) Assignee: National Institute of Information and Communications Technology, Koganei-shi, Tokyo (JP)

(*) Notice: Subject to any disclaimer, the term of this patent is extended or adjusted under 35 U.S.C. 154(b) by 361 days.

(21) Appl. No.: 12/671,114

(22) PCT Filed: Jul. 29, 2008

(86) PCT No.: PCT/JP2008/063608
§ 371 (c)(1),
(2), (4) Date: Jan. 28, 2010

(87) PCT Pub. No.: WO2009/017134
PCT Pub. Date: Feb. 5, 2009

(65) Prior Publication Data
US 2010/0195055 A1  Aug. 5, 2010

(30) Foreign Application Priority Data

Jul. 30, 2007  (JP) ................................ 2007-198198

(51) Int. Cl.
*G03B 21/28* (2006.01)
*G02B 27/14* (2006.01)

(52) U.S. Cl.
USPC ............... 353/10; 353/99; 359/479; 359/636

(58) Field of Classification Search ............... 353/7, 10, 353/98, 99; 359/479, 478, 459, 619, 627, 359/633, 630, 625
See application file for complete search history.

(56) References Cited

U.S. PATENT DOCUMENTS

| 3,417,398 | A | * | 12/1968 | Lewis et al. ................. 342/6 |
| 4,526,439 | A | * | 7/1985 | Okoshi et al. ................. 359/458 |
| 4,571,041 | A | * | 2/1986 | Gaudyn ................. 353/10 |
| 5,583,695 | A | * | 12/1996 | Dobrusskin ................. 359/633 |

(Continued)

FOREIGN PATENT DOCUMENTS

| CN | 1661418 A | 8/2005 |
| GB | 2287549 A | 9/1995 |

(Continued)

OTHER PUBLICATIONS

Korean Office Action dated Jun. 30, 2011, issued in corresponding Korean Patet Application No. 10-2010-7004279 with Partial Translation.

(Continued)

*Primary Examiner* — William C Dowling
(74) *Attorney, Agent, or Firm* — Westerman, Hattori, Daniels & Adrian, LLP

(57) ABSTRACT

A multi-viewpoint floating image display device enabling observation from multiple viewpoints by combining mirror images of objects to be projected and spatially separated from one another as real images in a small region in space. The display device comprises a multi-viewpoint floating image display optical system having real mirror imaging optical systems each of which forms a real image of each of the objects in a plane-symmetric position symmetric to the object with respect to one geometrical plane which is the symmetry plane. All the real mirror imaging optical systems are so arranged that the angle formed by given symmetry planes is less than 180 degrees on the real image side with respect to the symmetry planes. The objects are so arranged as to correspond to the respective real mirror imaging optical systems.

14 Claims, 19 Drawing Sheets

U.S. PATENT DOCUMENTS

| | | | | |
|---|---|---|---|---|
| 5,861,993 | A | * | 1/1999 | Shanks et al. .................. 359/629 |
| 7,561,330 | B2 | * | 7/2009 | Goto .............................. 359/459 |
| 8,123,370 | B2 | * | 2/2012 | Maekawa ....................... 359/857 |
| 2005/0168814 | A1 | * | 8/2005 | Tomisawa et al. ............ 359/462 |

FOREIGN PATENT DOCUMENTS

| | | |
|---|---|---|
| JP | 9-506717 A | 6/1997 |
| JP | 2005-010755 A | 1/2005 |
| JP | 2005-148234 A | 6/2005 |
| JP | 2006-317708 A | 11/2006 |
| JP | 2009-025776 A | 2/2009 |
| WO | 95/16935 A1 | 6/1995 |
| WO | 2007/116639 A1 | 10/2007 |
| WO | 2008/111426 A1 | 9/2008 |
| WO | 2008/156163 A1 | 12/2008 |

OTHER PUBLICATIONS

Satoshi Maekawa et al, "Transmissive Optical Imaging Device with Micromirror Array", Proceedings of SPIE, vol. 6392, Oct. 3-4, 2006, pp. 63920E-63920E8.

Satoshi Maekawa "2-men Corner Reflector Array ni yoru Tashiten Kara Kansatsu Kano na Kukan Eizo Hyoji", 3D Eizo, vol. 21, No. 4, Dec. 15, 2007, pp. 29-32.

Satoshi Maekawa "Kagami Eizo no Jitsuzo o Ketsuzo suru Judo Kogaku Soshi no Kaihatsu", Image Lab, Apr. 1, 2007, pp. 66-67.

International Search Report of PCT/JP2008/063608, mailing date of Nov. 11, 2008.

Chinese Office Action dated Jan. 26, 2011, issued in corresponding Chinese Patent Application No. 200880100689.8.

Japanese Office Action dated Nov. 2, 2012, issued in corresponding Japanese Patent Application No. 2009-525414, (9 pages). With English Translation.

* cited by examiner

Fig.2
(a)
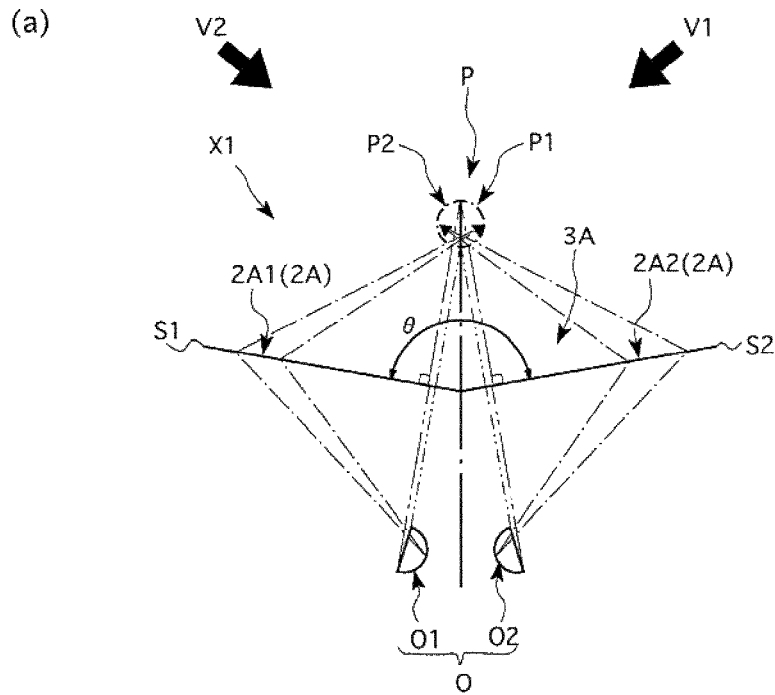
(b)
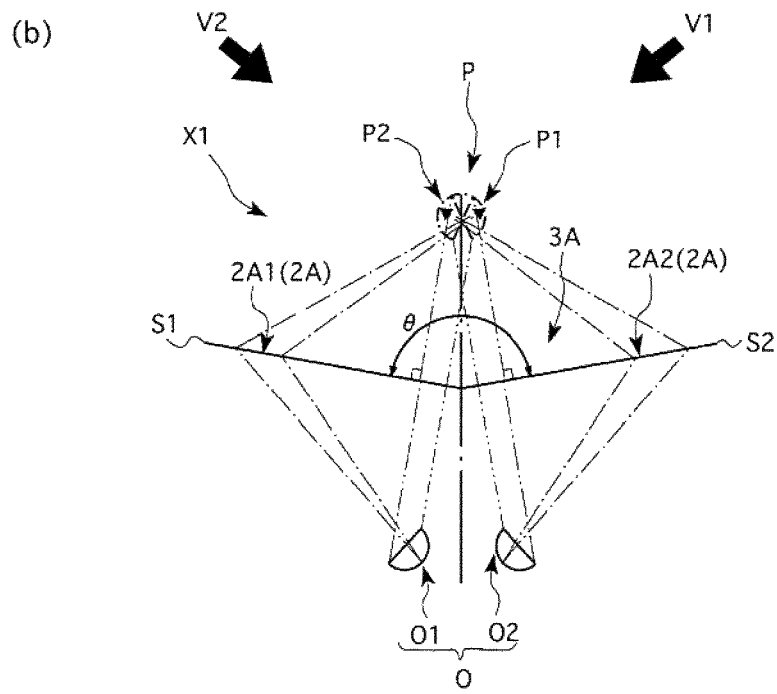

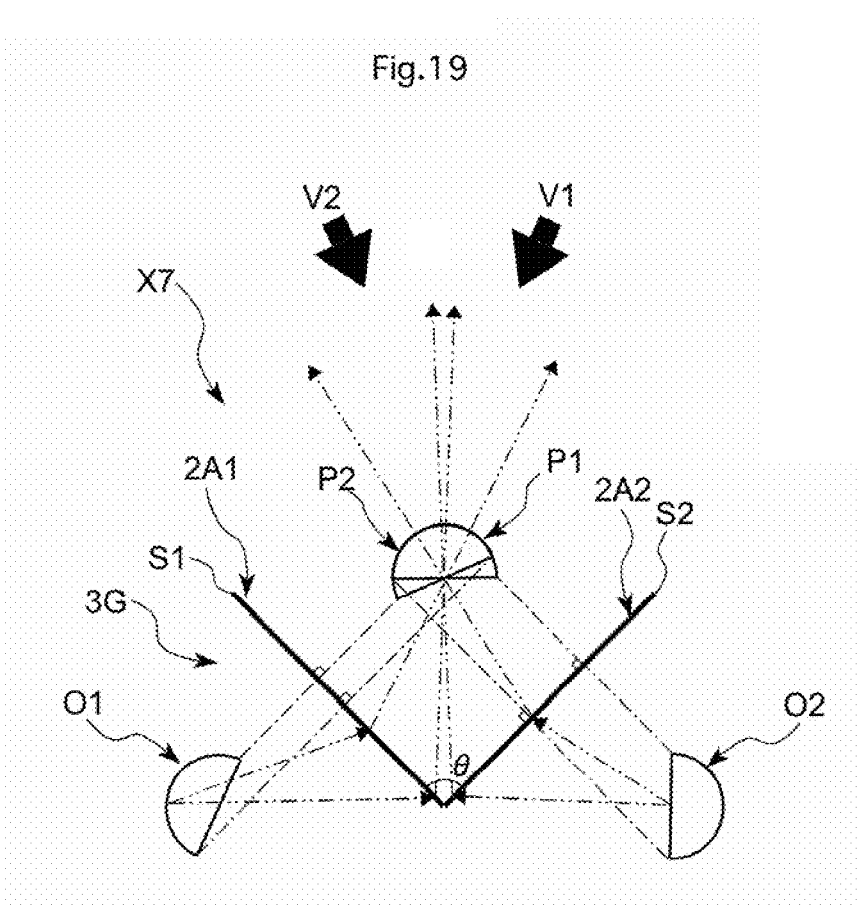

MULTI-VIEWPOINT FLOATING IMAGE DISPLAY DEVICE

FIELD OF THE INVENTION

The present invention is related to a multi-viewpoint floating image display device including a multi-viewpoint floating image display optical system combining real images of objects to be projected to form an image in a small region in space so that the formed image can be observed from multiple viewpoints.

BACKGROUND OF THE INVENTION

Various optical devices (optical systems) have been proposed that are capable of forming a real image from a mirror image of an object to be projected that is placed to one side of an imaginary plane in space. The real image is formed in a position plane-symmetric to the object with respect to the imaginary plane. The inventor of the present invention has proposed a real mirror imaging device (hereafter called "dihedral corner reflector array" as necessary) which is an optical device including a large number of dihedral corner reflectors each including two specular surfaces (see Patent Reference No. 1) and a real mirror imaging optical system using a retroreflector array with retroreflection capability and a half-mirror (see Patent Reference No. 2).

The dihedral corner reflector array disclosed in Patent Reference No. 1, when an object (including physical objects and images) is placed to one of the sides of its optical device plane, will reflect light emitted from the above object by the pairs of specular surfaces of the dihedral corner reflectors while passing the reflected light through the optical device plane, thus forming a real image from mirror image of the above object in space at the observing side which is the other side across the optical device plane. The dihedral corner reflector array thus provides a novel way of optical imaging. The principle of operation of the dihedral corer reflector array is based on reflection of light by specular surfaces and can constitute a transmissive imaging device. By appropriately arranging multiple dihedral corner reflectors in one optical device plane, for example by directing the dihedral corner reflectors in one optical device plane to different directions, a real mirror imaging optical system can be constructed capable of forming a floating image that is observable from different directions by many observers (see Patent Reference No. 3). The real mirror imaging optical system disclosed in Patent Reference No. 2 has a novel way of optical imaging that effectively combines the property of the retroreflector to reflect incident light back in the incident direction with the property of the half-mirror to both reflect and transmit light, thereby enabling a floating image to be observed from a wide viewing angle.

Another real mirror imaging optical system has been proposed that makes use of reflection of light. The system uses an afocal lens array including an afocal optical system with infinite focal distance to form an image of an object to be projected in a position in space that is symmetric to the object with respect to the optical device plane of the afocal lens device (see Patent Reference No. 4).

Patent Reference No. 1: WO 2007/116639
Patent Reference No. 2: JP 2009-025776
Patent Reference No. 3: WO 2008/111426
Patent Reference No. 4: JP 2005-010755

SUMMARY OF THE INVENTION

Problems to be Solved by the Invention

In an existing real mirror imaging optical system such as the systems disclosed in Patent References 1, 3, and 4, when an object to be projected is a three-dimensional image, a real image of the object that is produced by the optical system is a mirror image viewed from the back side and therefore is reversed in depth. The dihedral corner reflector array described in Patent Reference No. 1 and the afocal lens array described in Patent Reference No. 4 have limited viewing angles and are incapable of displaying floating images observable from multiple directions by themselves. While the dihedral corner reflector array is capable of widening the lateral viewing angle by carefully choosing the locations of the dihedral corner reflectors as described in Patent Reference No. 3, the image observed is still reversed in depth. The retroreflector-based real mirror imaging optical system disclosed in Patent Reference 2 is capable of widening the viewing angle without any additional means. However, again, the image observed is reversed in depth.

In light of the above problems, the purpose of the present invention is to provide a novel display device using the property of the existing optical device or optical system described above that forms an image in a position symmetrical with respect to a plane to enable an image of an object to be observed from multiple viewpoints and also being capable of displaying a three-dimensional floating image observable from multiple viewpoints and unreversed in depth.

Means for Solving the Problems

A multi-viewpoint floating image display optical device according to the present invention includes a multi-viewpoint floating image display optical system including a plurality of real mirror imaging optical systems each being capable of forming a real image of an object to be projected, in a plane-symmetric position symmetric to the object to be projected with respect to a geometrical plane which is a symmetry plane, wherein all of the real mirror imaging optical systems are so arranged that the angle formed by any of the symmetry planes is less than 180 degrees on the real image side with respect to the symmetry planes; and the object to be projected is so positioned as to correspond to the respective real mirror imaging optical systems.

With this configuration, real images of objects to be projected (which may be two-dimensional or three-dimensional objects or images) which are individually positioned in space on one side across the symmetry planes of the multiple real mirror imaging optical systems so as to correspond to their respective symmetry planes are formed in plane-symmetric positions with respect to the respective symmetry planes. Accordingly, the real images can be observed from different view points corresponding to the multiple real mirror imaging optical systems, that is, multiple view points. Since the symmetry planes are so arranged that the angle formed one symmetry plane with another symmetry plane is less than 180 degrees in space on the real image forming side (the space opposite to the objects with respect to all symmetry planes), real images formed by all real mirror imaging optical systems can be combined in a small region in space by adjusting the relative positions and angles with respect to the symmetry plane of the objects placed in the different positions. The multi-viewpoint floating image display can also be constructed so that real images are not combined in a small region in the space. To combine real images of objects in a small region as described above, the objects are placed in positions symmetric to the positions where the real images are to be combined with respect to the symmetry planes. Since each of real images combined in a given region and observed from each individual viewpoint is a real image formed through a symmetry plane facing the direction of observation, the real image is not affected by another real image formed through a symmetry plane corresponding to another observation direction. That is, even if combined real images of the objects spatially overlap one another, interference and overlapping of the real images is not visible from the viewpoints.

The objects to be projected may be different physical objects or images or may be the same physical objects or images. If physical objects or images to be projected are the same in every way, including orientation with respect to the viewpoints, all real images of the objects formed by the real mirror imaging optical systems will be identical and therefore observers will observe exactly the same images. If objects to be projected are not the same but are sub-objects into which a single physical object or image is divided, are reversed in depth if they are solids, and are positioned so that the original physical objects or images are reproduced in real image formation positions, images of the single object or image viewed from different directions are formed. Accordingly, one observer can observe the real images as one single physical object or image that is visible from different directions as the observer moves. By overlapping real images of the sub-objects one another so that the real images can be observed at the boundary between real mirror imaging optical systems as well, the real images of the sub-objects can be made observable as a seamless single object or image.

Since images of multiple objects to be projected are combined in a small region in space so that the combined images can be observed as described above, a three-dimensional floating image that is unreversed in depth can be observed from the observing side (real image side) by, for example, placing multiple three-dimensional images (objects to be projected) reversed in depth beforehand on one across the symmetry planes. For instance, if an object is an image projected on the inner side of a hollow hemispherical cup, a "real image of the object" can be observed as an image that appears on the outer perimeter of an imaginary hemispherical cup on the observing side. Accordingly, an "image of the object" appearing on the outer surface of an imaginary sphere can be made observable from the observing side by projecting an image onto the inner surface of each of two hemispherical cups that are identical in shape. Since an image of an object is projected upside down, the images to be projected onto the hemispherical cups are preferably turned upside down beforehand.

One example of the multi-viewpoint floating image display device described above is a device in which at least one of the real mirror imaging optical systems constituting the multi-viewpoint floating image display optical system is a dihedral corner reflector array consisting of multiple dihedral corner reflectors arranged on a given optical device plane. Each of the dihedral corner reflectors includes mutually perpendicular two specular surfaces that are normal to the given optical device plane and the optical device plane is the symmetry plane. In this multi-viewpoint floating image display device, light from an object to be projected is reflected once by the two specular surfaces of each dihedral corner reflector while passing through each optical device plane and forms a real image in space across the optical device plane. That is, an observer can observe a real image of the object that has been formed by light reflected by the dihedral corner reflectors each having two specular surfaces whose internal corner faces the line of sight of the observer. Since the observable range of a real image formed by the dihedral corner reflector array in which all dihedral corner reflectors face in the same direction is limited to an angle of several tens of degrees in the horizontal direction, the orientations of the dihedral corner reflectors need to be adjusted according to viewpoints in order to enable the real image to be observed from multiple viewpoints. In terms of manufacturing, directing the dihedral corner reflectors to the same direction contributes to cost reduction. Therefore, the multi-viewpoint floating image display optical system may be constructed by combining multiple dihedral corner reflector arrays each of which consists of dihedral corner reflectors facing in the same direction according to each viewpoint. In that case, the optical device planes are so arranged that the angle formed by any two of the optical device planes is less than 180 degrees on the observing side. Accordingly, multiple objects corresponding to the respective optical device planes can be arranged and images of the objects can be observed from the respective viewpoints.

For example, all of the multiple dihedral corner reflectors constituting one single optical device plane may be directed to a predetermined one point. In that case, an object to be projected or a viewpoint can be located at almost the front of each dihedral corner reflector and the observable range of the dihedral corner reflectors can be effectively used.

More specifically, one implementation of the present invention that uses dihedral corner reflectors may include a set of dihedral corner reflector arrays sharing an optical device plane. Compared with an implementation in which dihedral corner reflectors directed in different directions are formed at a time on a single optical device plane, this implementation can be easily manufactured at low cost by, for example, planarly combining multiple dihedral corner reflector arrays each including dihedral corner reflectors facing in the same direction so as to function as a single dihedral corner reflector array. Another implementation can be provided by planarly combining dihedral corner reflector arrays, each including multiple dihedral corner reflectors directed to a predetermined point, in such a manner that the dihedral corner reflector arrays are directed in different directions so as to function as a single dihedral corner reflector array. In a dihedral corner reflector array including dihedral corner reflectors directed to a predetermined point, stray light caused by one reflection of light at an edge of the array can present a problem. The configurations described above can inhibit such stray light.

Stray light can occur in a multi-viewpoint floating image display optical system that uses dihedral corner reflectors described above or a multi-viewpoint floating image display device including such system if dihedral corner reflectors directed in different directions are placed close to each other in a close vicinity of an object to be projected. Therefore, the dihedral corner reflectors are not provided in a given region on the optical device plane including the normal to optical device plane of the multi-viewpoint floating image display optical system that passes through the object to be projected, thereby preventing stray light to enable a clear image to be observed. The region on the optical device plane where no dihedral corner reflectors are provided for prevention of stray light is preferably opaque or shielded from light.

The dihedral corner reflector will be described here. The dihedral corner reflector can be considered as an optical hole penetrating the optical device plane and has inner walls used as speculator surfaces for appropriately bending light as the light passes through the optical device plane. However, the dihedral corner reflector just described is only a conceptual image. It does not necessarily need to have a shape defined by physical boundaries. For example, the optical holes may be connected together instead of being separated from one another.

Basically, the dihedral corner reflector array has a structure in which many speculator surfaces nearly perpendicular to the optical device plane are arranged on the optical device plane. An issue with the structure is how the speculator surfaces should be supported and fixed on the optical device plane. A specific method for forming the speculator surfaces of a dihedral corner reflector array having a substrate that defines a given space, for example, is to define a flat plane along the substrate as the optical device plane and use, as speculator surfaces, inner walls of holes formed in the substrate, which are optical holes penetrating the optical device plane. The internal space in the holes formed in the substrate only need to be transparent so as to transmit light and may be vacuum or filled with a transparent gas or liquid. The holes may have any shape as long as they have one or more noncoplanar specular surfaces that function as unit optical elements as inner walls and light reflected by the specular surface or surfaces can pass through the holes. The holes may be connected with one another or have an intricate notched shape. For example, an implementation in which separate specular surfaces stand in large numbers on the surface of the substrate can be considered as being an implementation in which holes connected one another are formed.

Alternatively, the dihedral corner reflectors may be tubes made of a transparent solid such as glass or resin that act as optical holes. Tubes made of a solid may be in close contact with one another so as to act together as a supporting member, or may protrude from the surface of a substrate if they have one. The tubes may have any shape as long as they have one or more noncoplanar specular surfaces that function as dihedral corner reflectors as inner walls and light reflected by the specular surface or surfaces can pass through the tubes. The tubes may be connected with one another or may have an intricate notched shape.

The optical holes may be cubic or rectangular solid in shape in which all of adjacent inner walls are perpendicular to each other to form. In that case, the distance between the dihedral corner reflectors can be minimized so that the dihedral corner reflectors can be densely disposed. However, it is desirable that reflection from the surfaces except the dihedral corner reflectors directed to an object to be project be suppressed.

If the dihedral corner reflector includes more than one specular surface, there can be multiple-reflection transmitted light which has been reflected more times than intended. If two mutually perpendicular specular surfaces are formed on the inner walls of optical holes so as to prevent the multiple reflections, the surfaces except the two specular surfaces may be made a nonspecular surface that does not reflect light, or may be provided at an angle not perpendicular to the optical device plane, or may be curved, to reduce or eliminate multiple-reflection light reflected more than two times. To make the surface nonspecular, the surface may be coated with an antireflection coat or thin film or the roughness of the surface may be increased enough to diffusely reflect light. Since a transparent flat substrate does not inhibit the functions of the optical device, the transparent flat substrate can be used as a supporting and protecting member.

To increase the brightness of a real mirror image of a projected object, multiple dihedral corner reflectors are preferably arranged on the optical device plane with a minimum distance between them. For example, it is advantageous to arrange the dihedral corner reflectors in a grid pattern, which also has the advantage of being easy to manufacture. The specular surfaces of the dihedral corner reflectors may be flat surfaces made of a shiny material such as solid or liquid metal or resin that reflect light or may be flat interfaces between transparent media having different refractive indices that reflects or totally reflect light. If the specular surfaces are totally reflecting, multiple reflections can be naturally inhibited because angles of unwanted multiple reflections at the specular surfaces are more likely to exceed the critical angle of total internal reflection.

The specular surface may be formed on small areas of inner walls of optical holes or may be made up of multiple unit specular surfaces arranged in parallel with each other, provided that they function appropriately. The latter means that a single specular surface may be divided into unit specular surfaces, in other words. In that case, the unit specular surfaces do not necessarily need to be coplanar; they only need to be in parallel with each other. The unit specular surfaces may abut one another or may be spaced apart. A dihedral corner reflector array functioning as a real mirror imaging device requires dihedral corner reflectors each having two specular surfaces perpendicular to each other. Therefore two mutually perpendicular specular surfaces need to be provided in each unit optical element. The two mutually perpendicular specular surfaces do not necessarily need to be in contact with each other. Since it is essential only that light be reflected once at each of the pair of specular surfaces as the light travels from one side across the optical device plane to the other, the pair of specular surfaces may abut or be spaced apart from each other.

In one specific exemplary implementation of the present invention that does not use dihedral corner reflectors described above, at least one of the real mirror imaging optical systems is an afocal lens array in which multiple afocal lenses with optical axes normal to a given optical device plane are arranged on the optical device plane, which is the symmetry plane. Afocal lenses have focal points that are infinitely distant. The afocal lens may be formed by a pair of lenses that have optical axes normal to the optical device plane and are provided at a distance equal to the sum of their focal distances from each other. An afocal lens array can be formed by arranging a large number of such pairs of afocal lenses on an optical device plane. Both of the afocal lenses of each pair may be convex lenses or optical fiber lenses.

In a multi-viewpoint floating image display optical system using such afocal lens arrays, any given optical device planes are provided at an angle less than 180 degrees on the real image side because a real image formed will be observed from a position nearly perpendicular to each of the optical device planes. Accordingly, the real image of the object can be observed from a number of viewpoints corresponding to the number of the optical device planes, that is, the number of afocal lens arrays.

In a specific exemplary implementation of the present invention that does not use dihedral corner reflectors nor afocal lens arrays, at least one of the real mirror imaging optical systems constituting a multi-viewpoint floating image display optical system includes a retroreflector array which reflects light back toward the light source and half-mirrors each having a half-mirror surface reflecting and transmitting light. The half-mirror surface is the symmetry surface and the retroreflector array is provided in space on the same side of the half-mirror as an object to be projected with respect to the half-mirror. "Retroreflection" by the retroreflector is a phenomenon in which incident light is reflected (returned) back along the same direction as incidence and the incident light and reflected light are in parallel with each other but are opposite in direction. The retroreflector array consists of such reflectors arranged in an array. If the individual retroreflectors are sufficiently small, the reflected-light path can be assumed to overlap the incident-light path. The retroreflectors in the retroreflector array do not necessarily need to be coplanar; the retroreflectors may be three-dimensionally distributed. The half-mirrors are capable of both transmitting and reflecting light. The ratio of the transmittance to reflectance of the half-mirrors is ideally approximately 1:1.

The retroreflectors may be ones that consist of three adjacent specular surfaces (which broadly can be called "corner reflectors") or cat's-eye retroreflectors. The corner reflectors may be ones in which the three specular surfaces are perpendicular to each other, or ones in which the angle between two of the three specular surfaces is 90 degrees and the other angle is 90/N degrees (where N is an integer), or acute-angled ones in which the angles between the three specular surfaces are 90, 60, and 45 degrees.

In a multi-viewpoint floating image display optical system using such retroreflector arrays and half-mirrors, light from an object to be projected is reflected at the surface of the half-mirror, and then retro-reflected by the retroreflector array back toward the light source and passes through the half-mirror surface to form an image. The retroreflector array may have any shape and be positioned at any location, provided that the retroreflector can receive light reflected from the half-mirror. Since a real image formed can be observed from the direction opposing light passing through the half-mirror surface and the angle formed by the half-mirrors is less than 180 degrees on the real image side, the real image of the object can be observed from a number of viewpoints corresponding to the number of half-mirrors.

The multiple real mirror imaging optical systems in a single multi-viewpoint floating image display optical system can be of the same type or of different types. For example, a multi-viewpoint floating image display optical system can include any combination of real mirror imaging optical systems using dihedral corner reflector arrays, real mirror imaging optical systems using afocal lens arrays, and a real mirror imaging optical systems using a combination of reflector arrays and half-mirrors, as appropriate.

In the present invention, a blocking element can be provided between objects to be projected that correspond to the symmetry planes of the real mirror imaging optical systems to block light coming from one of the objects from reaching the symmetry plane that does not correspond to that object and block light from the other object from reaching the other symmetry plane, thereby preventing light from the objects from forming images on the symmetry planes that do not correspond to the objects. This can ensure the one-to-one relationship between each symmetry plane and its corresponding object to enable observation of a clearer real image.

When a real image of an object to be projected is observed using the multi-viewpoint floating image display device of the present invention, the image is formed by light passing obliquely through the symmetry planes of multiple real mirror imaging optical systems provided behind the real image. However, when those symmetry planes are observed from the opposite direction, the object to be projected placed below the symmetry planes may be directly observable. In the case of an optical system in which the symmetry plane is a half-mirror, an object to be projected is especially clearly directly observable. To prevent this, a light controlling means that transmits, blocks, or disperses only light coming from a certain direction may be provided on the real image formation side, thereby transmitting only light contributing to image formation while blocking light from the direction in which the object to be projected is visible through the symmetry plane. This hides the object under the symmetry plane from the observer while allowing the observer to observe only the floating real image. Examples of the light controlling means include the visibility control film "Lumisty" (a product of Sumitomo Chemical Co., Ltd., Japan) that disperses only light coming from specific directions and visibility control films that block only light in specific directions (for example, "Light Control Film" (a product of Sumitomo 3M Co., Ltd.)).

Furthermore, according to the present invention, objects to be projected may be sub-objects into which one solid (which may be a three-dimensional object or image) is reversed in depth. The sub-objects are associated and located with the symmetry planes of multiple real mirror imaging optical systems so that real images of the sub-objects viewed from different viewpoints are combined together to form the original solid. In this way, the set of real images can be combined to form a single three-dimensional static image having an unreversed depth of the solid. An observer can observe a portion of the three-dimensional static image from each viewpoint and can observe the three-dimensional static image from different directions as the observer moves from one viewpoint to another.

In another multi-viewpoint floating image display device, objects to be projected are portions of one solid that correspond to different shapes of the solid that are visible when observed from different viewpoints. The multi-viewpoint floating image display device further includes a rotating means for rotating the objects to be projected and an instantaneous visualizing means for instantaneously visualizing each of the objects in synchronization with rotation of the object by the rotating means as a static image of the object. With this, real mirror images of the objects to be projected can be observed one after another from one viewpoint as each object is rotated by the rotating means and thus the entire floating image of the solid can be observed. Multiple such viewpoints can be set. Each of the objects to be projected can be a portion of the solid that is reversed in depth, so that a floating image having the same, normal concaves and convexes as the solid can be observed. The instantaneous visualizing means may be a stroboscope that emits light in synchronization with the rotation or a shutter that opens in synchronization with the rotation.

In another preferable implementation, an object to be projected is an image that appears on a curved surface. The image appearing on the curved surface may be an image projected on a curved screen by a device such as a projector or an image displayed on a flexible display such as a flexible organic electroluminescence display or electronic paper that is curvedly bendable. With this implementation, convexity and concavity can be provided to a real image of the object to be projected, thereby a stereoscopic floating image can be displayed.

Effects Achieved by the Invention

Any of the multi-viewpoint floating image display device according to the present invention can combine mirror images of multiple objects to be projected to form a real image observed from viewpoints corresponding to the objects. Real images of objects to be projected that vary in shape when viewed from different viewpoints can also be formed in a given location in a small space to allow the observer to observe the real images individually. Since the real mirror imaging optical systems of the multi-viewpoint floating image display device have the property of reversing the depth of an image of a three-dimensional object to be projected, the real mirror imaging optical systems cannot form a normal-depth three-dimensional image by themselves. However, according to the present invention, when multiple three-dimensional objects (objects to be projected) reversed in depth are associated with respective viewpoints and placed on one side of the optical device plane, a three-dimensional floating image with normal depth can be observed from the observing side.

BRIEF DESCRIPTION OF THE DRAWINGS

FIG. 2 is a side view schematically illustrating the multi-viewpoint floating image display optical system according to the first embodiment.

FIG. 19 is a side view schematically illustrating the multi-viewpoint floating image display optical system according to the fifth embodiment.

DETAILED DESCRIPTION OF THE INVENTION

Embodiments of the present invention will be described below with reference to the drawings.

First Embodiment

Figure 1:
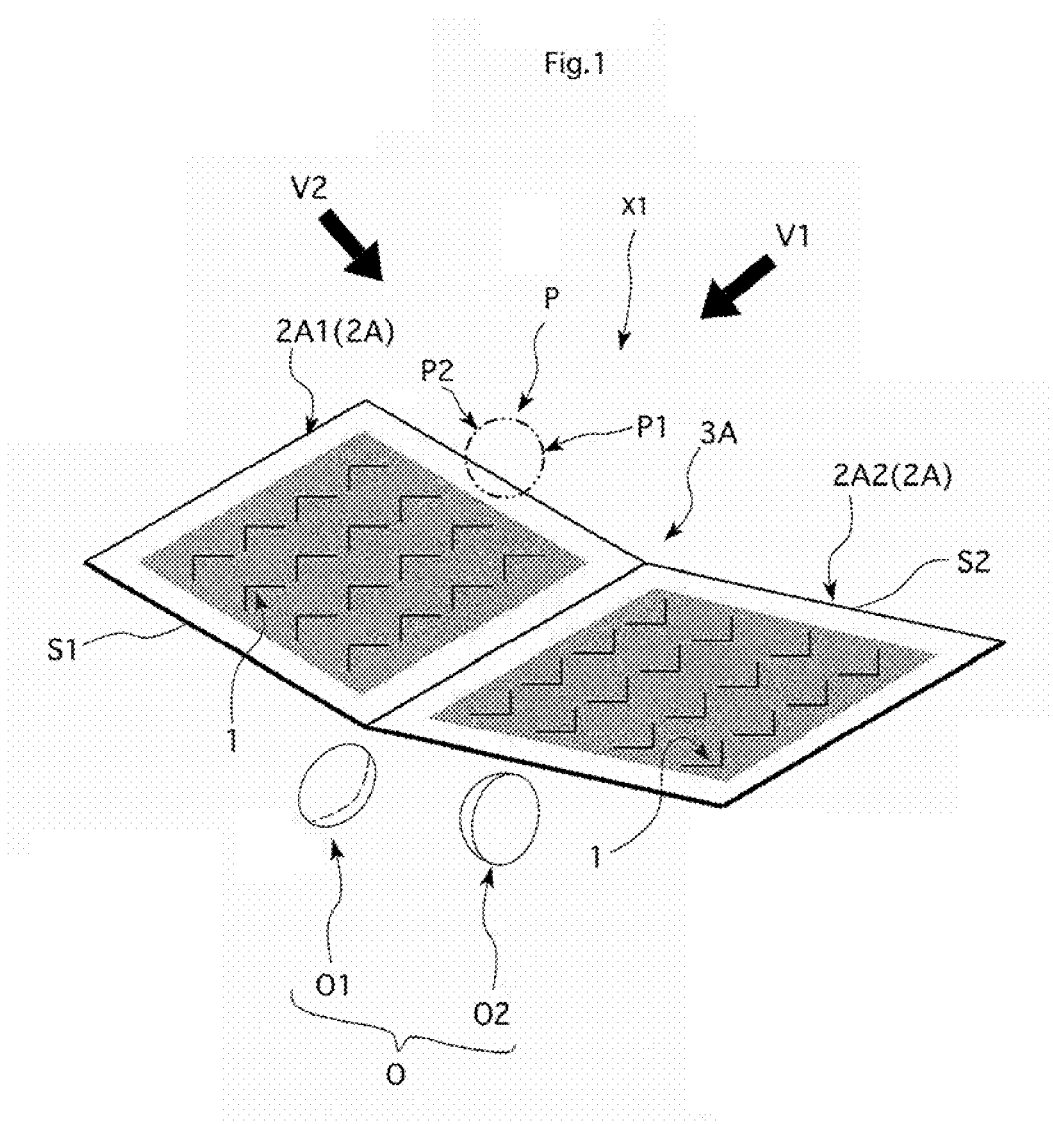
FIG. 1 is a perspective view schematically illustrating the multi-viewpoint floating image display optical system according to the first embodiment of the present invention.

A first embodiment of the present invention will be described with reference to FIGS. 1 to 5. As illustrated in FIG. 1, a multi-viewpoint floating image display device X1 according to the first embodiment includes a multi-viewpoint floating image display optical system 3A, which is one type of real mirror imaging optical system, including two real mirror imaging devices (hereinafter called "dihedral corner reflector arrays", denoted by 2A1 and 2A2 in the figure) in which a large number of dihedral corner reflectors 1 are formed and objects to be projected O1 and O2 placed correspondingly to the optical device planes S1 and S2 of the real mirror imaging devices 2A1 and 2A2, respectively. The optical device plane S1, S2 of each of the dihedral corner reflector arrays 2A1 and 2A2 is a plane nearly perpendicular to two specular surfaces 11 and 12 constituting each of the dihedral corner reflectors 1 of the dihedral corner reflector array 2A1 and 2A2. The dihedral corner reflectors arrays form a real image in plane-symmetric positions with respect to the symmetry planes, which are the optical device planes S1 and S2. The pair of dihedral corner reflector arrays 2A1 and 2A2 are opposed to each other so that the angle θ formed by the optical device planes S1 and S2 is less than 180 degrees on the observing side as illustrated in FIG. 2. For example, objects to be projected O1 and O2 are placed to one side of the optical device planes S1 and S2 (under the optical device planes S1 and S2 in the example depicted) at the junction between the dihedral corner reflector arrays 2A1 and 2A2 to enable a real mirror image P1 of the object to be projected O1 and a real mirror image P2 of the object to be projected O2 to be observed from viewpoints V1 and V2 through the dihedral corner reflector array 2A1 and 2A2, respectively, on the other side of the optical device planes S1 and S2 (above the optical device planes S1 and S2 in the example depicted). Although the same observer cannot view the two real mirror images P1 and P2 from the viewpoints V1 and V2 at a time, it will be appreciated that, when overlooking, that a real mirror image P of an object O (an image formed by combining the two real mirror images P1 and P2 of the objects O1 and O2 in one location) can be observed.

Since the dihedral corner reflectors 1 are of minuscule dimensions as compared with the dihedral corner reflector arrays 2A1 and 2A2, the whole sets of the dihedral corner reflectors 1 are represented by gray shading and the orientation of the internal corner of each dihedral corner reflector 1 is indicated by a V mark in FIG. 1.

Specific configuration of each component and image forming formation methods will be described below. In the following description, the two dihedral corner reflector arrays 2A1 and 2A2 and the optical device planes S1 and S2 will be sometimes collectively denoted by 2A and S, respectively.

Figure 3:
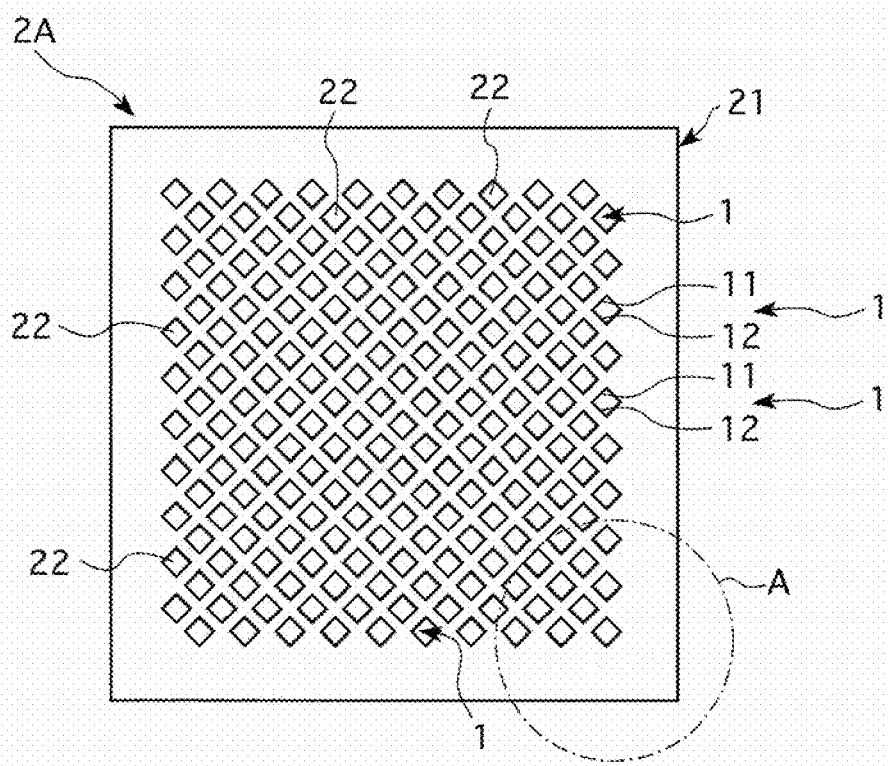
FIG. 3 is a plan view of the dihedral corner reflector array applied to the first embodiment.
Figure 4:
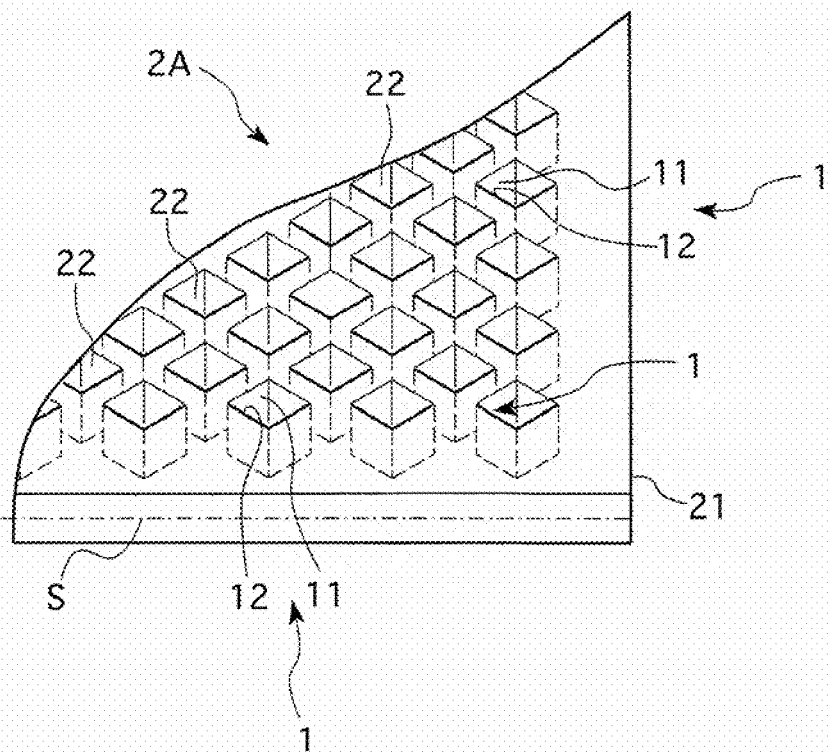
FIG. 4 is an enlarged perspective view of a part of the dihedral corner reflector array.
Figure 5:
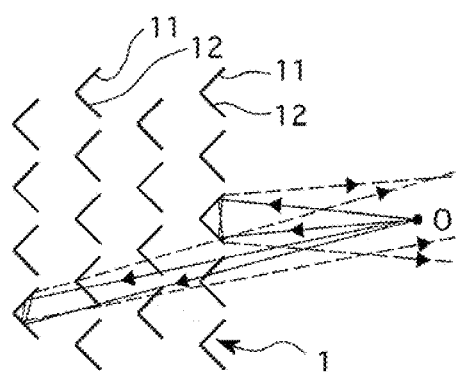
FIG. 5 is a plan view schematically illustrating image formation by the multi-viewpoint floating image display optical system according to the first embodiment.

As illustrated in FIG. 3, each dihedral corner reflector array 2A includes a flat-panel substrate 21 in which many holes 22 penetrating perpendicularly the flat substrate are formed in the thickness direction are formed. Specular surfaces 11 and 12 are formed on two mutually perpendicular inner walls of each hole 22 in order to use the inner walls as dihedral corner reflector 1.

The substrate 21 has the form of a thin slab with a thickness between 50 to 200 µm; it is set to 100 µm thickness; while in the present embodiment a flat square shape with each side having the same dimension of 5 cm is used, the thickness and lateral dimensions of substrate 21 are not restricted to the above-mentioned dimensions, but might be chosen appropriately as desired. As shown in detail A of FIG. 3, shown enlarged in FIG. 4, each dihedral corner reflector 1 is created by preparing physical and optical holes 22 penetrating substrate 21 in order to allow light to be transmitted. In the present embodiment, firstly a plurality of rectangular (concretely in the present example, square) holes 22 are prepared across substrate 21; then for each of those holes 22 a pair of adjacent inner walls perpendicular to each other are prepared with flat mirror finish into specular surfaces 11 and 12; thus the specular surfaces 11 and 12 serving as the dihedral corner reflectors 1. It is preferable for other parts of hole 22 than those used for the dihedral corner reflector 1 to be processed into non-reflecting surfaces instead of preparing them with mirror finish, or to tilt them, or use other methods in order to avoid multiple reflections. Each dihedral corner reflector 1 is made in such a way so that the direction of the inner corner enclosed by the specular surfaces 11 and 12 along substrate 21 points in the same direction. Hereafter the direction of the angle between those specular surfaces 11 and 12 shall be called the direction (aspect) of the dihedral corner reflector 1. Regarding the manufacturing of specular surfaces 11 and 12, in the present embodiment firstly a metal mold is prepared, then the inner walls for the specular surfaces 11 and 12 are processed by nanoscale cutting into mirror surfaces, with a surface roughness not exceeding 10 nm, to serve as uniform specular surfaces for the entire band of the visible spectrum.

In concrete terms, the specular surfaces 11 and 12 of each dihedral corner reflector 1 might have a side length of 50 to 200 μm, and in case of the present embodiment they are set to 100 μm to match the thickness of substrate 21; after the above-mentioned metal mold has been manufactured it is used in a nanoscale pressing process called nano-imprint process or in an electroforming process, so that in a single substrate 21 a plurality of the dihedral corner reflectors 1 shall be formed with a certain pitch. In the present embodiment each side of the dihedral corner reflectors 1 of the dihedral corner reflector array 2A, the sides forming a V shape along the optical device plane S, is arranged at 45 degrees with respect to the width and depth of substrate 21, and all of the dihedral corner reflectors 1 are located along the grid points of an imaginary mesh laid on the optical device plane S facing in the same direction. By making the distance between two adjacent dihedral corner reflectors 1 as small as possible, the light transmittance can be improved. Furthermore, those regions of the substrate 21 without dihedral corner reflectors 1 are treated with light absorbing coating, and thin transparent reinforcing plates, not shown in the drawing, are placed on the top and bottom surfaces of substrate 21. In the present embodiment a dihedral corner reflector array 2A with several tens or hundreds of thousands of dihedral corner reflectors 1 on the substrate 21 is employed.

If substrate 21 is manufactured by electroforming from metals like aluminum, nickel, or such, when the surface roughness of the specular surfaces 11 and 12 on the mold is sufficiently low, they become naturally mirror surfaces. On the other hand, if substrate 21 is manufactured from resin or such using nano-imprint technology, it might be necessary to prepare mirror surface coatings by sputtering or such in order to create the specular surfaces 11 and 12.

When dihedral corner reflectors 1 are created along substrate 21 in the above-mentioned manner, they shall have the property that light entering a hole 22 from the top (or bottom) side of substrate 21 shall be reflected from one of the specular surfaces (11 or 12), then that reflected light shall be once more reflected by the other specular surface (12 or 11), thus passing through to the bottom (or top) side of substrate 21; the incident light path and the exiting-light path will be plane-symmetric with respect to the substrate 21 (optical device plane S) between them, therefore by preparing in the above-mentioned manner a multitude of dihedral corner reflectors 1 along substrate 21, they will behave as a dihedral corner reflector array 2A. Therefore the optical device plane S (assuming a plane passing through the center of substrate 21 in its thickness direction, perpendicularly to each specular surface, indicated by an imaginary line in FIG. 4) of the dihedral corner reflector array 2A shall be a symmetry plane across which the floating real image P of the object to be projected O that is placed to one side of substrate 21 shall be formed as a mirror image (real mirror image) on the other side in a plane-symmetric position.

The multi-viewpoint floating image display optical system 3A has two dihedral corner reflector arrays 2A (2A1 and 2A2) described above. The dihedral corner reflector arrays 2A1 and 2A2 are joined together at their edges in such a manner that the dihedral corner reflectors 1 in the dihedral corner reflector array 2A1 are opposed to those in the dihedral corner reflector array 2A2, the angle θ between the optical device planes S1 and S2 is less than 180 degrees (for example 160 degrees), and each of the optical device planes S1 and S2 is directed to a predetermined point (at which a real image is to be formed). Near the junction between the two dihedral corner reflector arrays 2A1 and 2A2, objects to be projected O1 and O2 are placed to one side of the optical device planes S1 and S2 (under the substrates 21) in the central area of the optical device planes S1 and S2. The objects to be projected O1 and O2 may be three-dimensional objects (solids) or images (three-dimensional images) or two-dimensional objects (for example letters or patterns on paper, strictly, which are not two-dimensional objects) or two-dimensional images (images projected on a planar screen). For example, as depicted in FIG. 2, the objects to be projected O1 and O2 may be images projected on the inner surfaces of hemispherical objects which are hollow cuplike objects (hereinafter called "cups") or the inner surfaces of the cups themselves. When images are to be projected on the objects O1 and O2, the objects O1 and O2 are preferably placed upside down so that erect images can be observed, because otherwise images P1 and P2 of the objects O1 and O2 would appear upside down. In the example illustrated in FIG. 2(a), the objects to be projected O1 and O2 are located and oriented so that the images P1 and P2 do not overlap each other whereas in the example illustrated in FIG. 2(b) the location and orientation of the two objects to be projected O1 and O2 are adjusted so that the images P1 and P2 slightly overlap each other, thereby ensuring continuity between the image P1 viewed by an observer from a view point V1 and the image P2 viewed by the observer from another view point V2 to improve observer comfort. The partial overlapping between the images P1 and P2 is suited for cases where a real mirror image P of an object O formed by combining sub-objects O1 and O2 into which the object O is divided is observed from different directions.

A way of image forming by the multi-viewpoint floating image display optical system 3A according to the present embodiment will be described in conjunction with the path of light from the object to be projected O. As schematically illustrated in the plan view of FIG. 5, as light from the object to be projected O (in the direction indicated by the solid arrows; in three dimensions, the light traveling from the back of the plane of the drawing toward the reader) passes through a hole 22 (omitted from FIG. 5) formed in the substrate 21 (omitted from FIG. 5) of the dihedral corner reflector array 2A, the light is reflected by one of the specular surfaces 11 (or 12) constituting the dihedral corner reflectors 1, then reflected by the other specular surface 12 (or 11), passes through the optical device plane S (the transmitted light is represented by the dashed lines), and spreads while passing a plane-symmetric position (position O in FIG. 5) symmetric to the object to be projected O (O1, O2) with respect to the optical device plane S1, S2 (omitted from FIG. 5) of each of the dihedral corner reflector arrays 2A1 and 2A2. The same occurs in the multiple dihedral corner reflectors 2 and the transmitted light ultimately converges in the plane-symmetric position to form real mirror images P (P1, P2). As schematically illustrated in FIG. 2, one of the mirror images P1 is observable from a position from where the specular surfaces 11, 12 of dihedral corner reflectors 1 of one dihedral corner reflector array 2A1 are visible, that is, from above the substrate 21 of the other dihedral corner reflector array 2A2. The same occurs for the real mirror image P2 of the object to be projected O2 formed by light passing through and reflected by the other dihedral corner reflector array 2A2.

To give an example, when viewed from a viewpoint V1, an object to be projected O1 that is an image projected on the inner surface (concave surface) of a hemispherical cup is observed as a real mirror image P1 projected on the surface (convex surface) of an imaginary sphere. When viewed from another viewpoint V2, an object to be projected O2 that is an image projected on the inner surface (concave surface) of a hemispherical cup is observed as a real mirror image P2 (indicated by a dashed line) projected on the surface (convex surface) of the imaginary sphere. For example, referring to FIG. 2, when an image (upside-down image) is projected on the inner wall of one of the hemispherical cups as an object to be projected O1 and an image continuous with the image of the object to be projected O1 is projected on the inner wall of the other hemispherical cup as an object to be projected O2, one of the images is observed from the viewpoint V1 as if the image were displayed on the surface of an imaginary sphere in the plane-symmetric position with respect to the optical device plane S1 and the other image is observed from the viewpoint V2 as if the image were displayed on the opposite surface. That is, the real mirror images P1 and P2 are reversals in concavity and convexity of the objects O1 and O2. Therefore, the concavity and convexity of the objects to be projected O1 and O2, which are three-dimensional objects to be observed, are reversed in concavity and convexity in the direction parallel to each optical device plane S beforehand so that the real image observed have correct concavity and convexity expected. By placing three-dimensional objects to be projected O1 and O2 in space under the substrates 21 in this way, three-dimensional images apparently combined in one position above the substrates 21 can be observed.

The attitudes of dihedral corner reflector arrays 2A1 and 2A2 of the multi-viewpoint floating image display device X1 according to the present embodiment depicted in FIG. 1 and described above can be changed to erect like a folding screen or partition so that the optical device planes S1 and S2 are erected in vertical fashion to form a multi-viewpoint floating image display optical system 3A in which real mirror images P1 and P2 floating in space in front of the dihedral corner reflector arrays 2A1 and 2A2 can be observed. Such a mode can be applied to another embodiment described below as well.

Variation of First Embodiment

Figure 6:
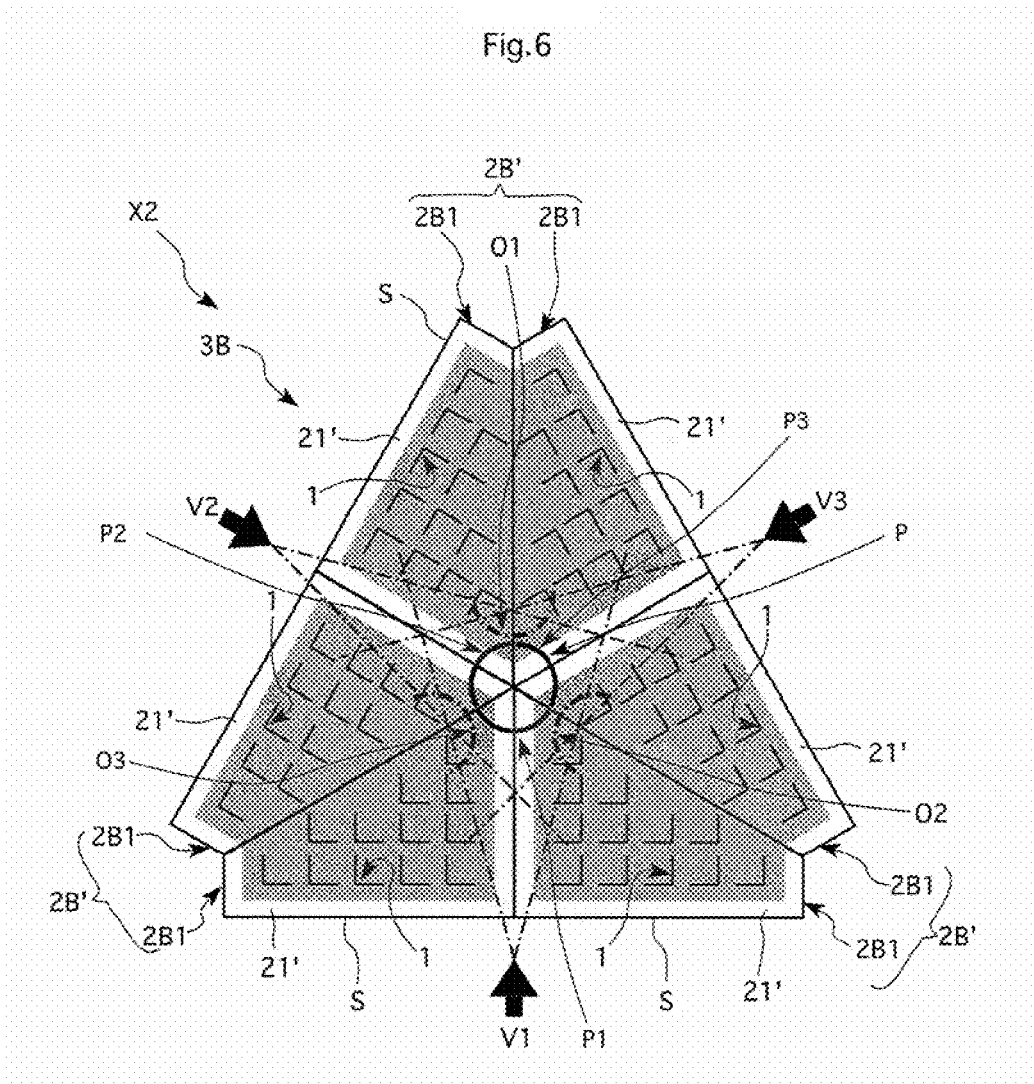
FIG. 6 is a plan view schematically illustrating the multi-viewpoint floating image display optical system according to a variation of the first embodiment.
Figure 7:
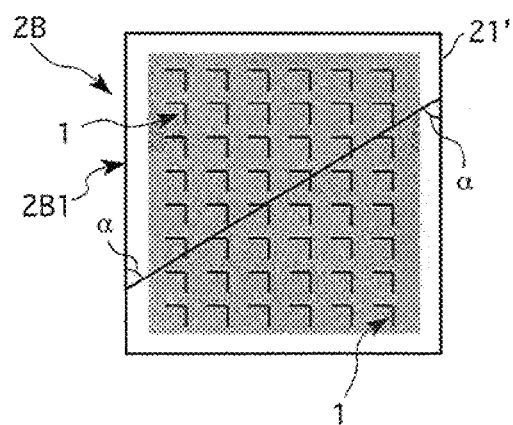
FIG. 7 is a plan view of the dihedral corner reflector array applied to the first embodiment.
Figure 8:
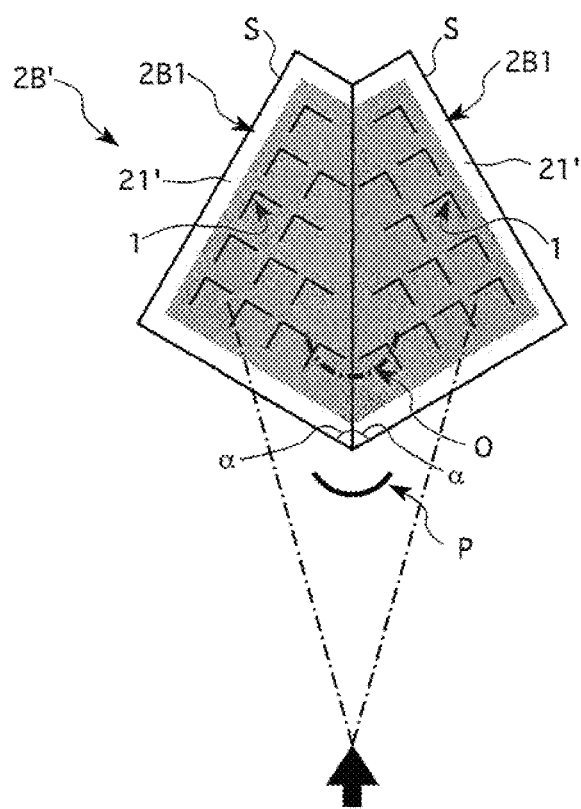
FIG. 8 is a plan view of a subject part schematically illustrating image formation by the multi-viewpoint floating image display optical system.

Here, a variation of the first embodiment of the present invention will be described with reference to FIGS. 6 through 8. Like the first embodiment, a variation of the first embodiment of the present invention schematically illustrated in the plan view of FIG. 6 is a multi-viewpoint floating image display device X2 which uses multiple dihedral corner reflector arrays and includes a multi-viewpoint floating image display optical system 3B that enables floating images of an object to be projected that are apparently combined in a small region to be observed from at least three directions. In FIG. 6, the sets of dihedral corner reflectors 1 are represented by gray shading and the direction of the internal corner of each dihedral corner reflector 1 is indicated by a V mark in an exaggerated manner (the same applies to FIG. 7 and subsequent drawings).

The multi-viewpoint floating image display optical system 3B of the variation can be constructed as follows. For example six dihedral corner reflector arrays 2B that are similar to the dihedral corner reflector arrays 2A in the first embodiment are provided. Each of the dihedral corner reflector arrays 2B is cut into halves and one of the halves (denoted by 2B1) is reoriented and rejoined to the other. Specifically, each dihedral corner reflector array 2B has a configuration similar to that of the dihedral corner reflector array 2A in the first embodiment. However, as depicted in FIG. 7, the dihedral corner reflectors 1 are angled by 45 degrees in the optical device plane S, the dihedral corner reflector array 2B is cut into two trapezoids along a straight line passing the center of the device and intersecting an edge of the device at an angle α less then 60 degrees, and one of the halves (the upper-left half in the example depicted) is used as a dihedral corner reflector array 2B1. As illustrated in FIG. 8, a pair of such a dihedral corner reflector array 2B1 and a flipped one 2B1 are joined together in such a manner that the long sides of the trapezoids adjoin to each other and the optical device planes S, S of the trapezoidal dihedral corner reflector arrays 2B1 are flush with each other to form one dihedral corner reflector array 2B'. In the dihedral corner reflector array 2B', the dihedral corner reflectors 1 in one of the two optical device plane S slightly differ in orientation from the dihedral corner reflectors 1 in the other optical device plane S, however they face in substantially the same direction. Three dihedral corner reflector arrays 2B' thus formed are provided and edges of all optical device planes S are joined together so that the angle formed by the three optical device planes S is less than 180 degrees. Thus, a multi-viewpoint floating image display optical system 3B of the variation can be provided in which the vertex angle (twice as large as the angle α) of each dihedral corner reflector array 2B' at the center is less than 120 degrees. In the multi-viewpoint floating image display optical system 3B thus provided, the junction in the center of the six dihedral corner reflector arrays 2B1 in the example in FIG. 6 is concave toward the back of the plane of the drawing as viewed from an observing side. It will be understood that the multi-viewpoint floating image display optical system 3B can also be constructed by using dihedral corner reflectors 1 provided on one substrate so as to face in a given direction, instead of cutting a square dihedral corner reflector array 2B.

When objects to be projected O1, O2, O3 are placed in space on one side (backside of the plane of the drawing) of the three dihedral corner reflector arrays 2B' in the multi-viewpoint floating image display device X2 thus provided, real mirror images P1, P2, and P3 of the objects to be projected O1, O2, O3 that are formed in the symmetric positions with respect to the optical device planes S can be observed from the observing side, which is the other side (above the plane of the drawing). As depicted in FIG. 6, the real mirror images P1, P2, and P3 can be collected in one position and observed from view points V1, V2, and V3 by appropriately positioning the objects to be projected O1, O2, and O3. That is, if objects to be projected O1, O2, O3 (represented by thick alternate long and short dashed lines) are substantial semicylinders into which an cylinder is divided and the semicylinders are associated with viewpoints, real mirror images P1, P2, and P3 of the objects to be projected O1, O2, and O3 can be observed from the viewpoints V1, V2, and V3, respectively, by an observing side. When these real mirror images P1, P2, and P3 are observed from above, a real mirror image P (represented by a thick circle in FIG. 6) formed by combining the real mirror images P1, P2, and P3 in one position can be observed. More specifically, in the dihedral corner reflector array 2B' consisting of two dihedral corner reflector arrays 2B1, 2B1 joined at the oblique sides of the trapezoids as depicted in FIG. 6, the dihedral corner reflectors 1 face in approximately the same direction, the direction of the viewpoint V1. Accordingly, an image of the object to be projected O1 formed by the dihedral corner reflector array 2B' can be observed from a position (the viewpoint V1) into which the oblique side of the trapezoids is extended across the central area of the multi-viewpoint floating image display optical system 3B. Since there are three possible combinations of dihedral corner reflector arrays 2B1 in which dihedral corner reflectors face in approximately the same direction in this way in the multi-viewpoint floating image display optical system 3B of the present embodiment, images can be observed from at least three directions (V1, V2, and V3). The dihedral corner reflectors 1 of the two dihedral corner reflector arrays 2B1 constituting one dihedral corner reflector array 2B' do not exactly face in the same direction but are at an angle of approximately 15 degrees with respect to the direction of the gaze. However, a difference of that order in angle is within the working range of the dihedral corner reflectors 1 and therefore the dihedral corner reflectors 1 can be deemed to be sufficiently close in direction.

As there is a high possibility that in the central part of the multi-viewpoint floating image display optical system 3B that is directly above the objects to be projected O1, O2, and O3 with respect to the substrate 21', if there would be several dihedral corner reflectors 1 close to each other pointing into different directions, unwanted stray light might occur and prevent the forming of clear images, it is advisable to omit the placing of dihedral corner reflectors 1, or otherwise prevent the transmission of light in those parts of the substrate 21' that overlap with the objects to be projected O1, O2, and O3 when viewed from above in order to prevent stray light beforehand.

Another Variation of First Embodiment

The multi-viewpoint floating image display devices that use dihedral corner reflector arrays are not limited to the first embodiment and its variation described above.

Figure 9:
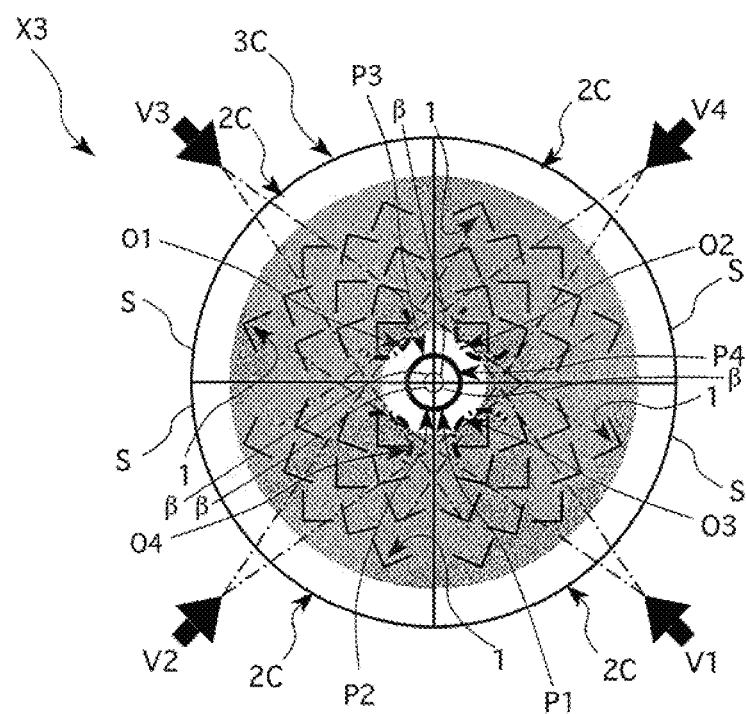
FIG. 9 is a plan view schematically illustrating the multi-viewpoint floating image display optical system according to another example of the first embodiment.

For example, as illustrated in the schematic plane view of FIG. 9, a multi-viewpoint floating image display device X3 may include a multi-viewpoint floating image display optical system 3C having four viewpoints. The multi-viewpoint floating image display optical system 3C of the multi-viewpoint floating image display device X3 consists of four dihedral corner reflector arrays 2C, each having the shape of a sector in planar view. The dihedral corner reflector arrays 2C are identical in shape and size, each of which has a vertex angle of less than 90 degrees in the central area of the device. The dihedral corner reflectors 1 of the dihedral corner reflector arrays 2C are formed in the same manner as in the first embodiment. The dihedral corner reflectors 1 of each dihedral corner reflector array 2C are oriented to the vertex. As in the variation described above, dihedral corner reflectors 1 are not formed in the central area in order to prevent stray light. Since the dihedral corner reflectors 1 are oriented toward the vertex of each dihedral corner reflector array 2C, the difference between the orientations of the dihedral corner reflectors 1 in the region of the junction between the dihedral corner reflector arrays 2 is minimized and therefore a floating image (real mirror image P) will be seamlessly visible at the junction between dihedral corner reflector arrays 2 as an observer moves from one viewpoint to another. The four dihedral corner reflector arrays 2C are arranged so that the angle θ between the optical device planes S is less than 180 degrees on the observing side. When four objects to be projected O1, O2, O3, and O4 represented by segments of a circle in FIG. 9 are placed, images P1, 92, P3, and P4 into which a cylindrical real mirror image P formed by combining the objects O1, O2, O3 and O4 in one small region is divided can be observed from four view points V1, V2, V3, and V4, respectively. The shape of the dihedral corner reflector arrays is not limited to the shape of a sector; the dihedral corner reflectors may have any shape, such as square, that has a planar area and does not prohibit observation of a real image. The multi-viewpoint floating image display device 3C of the variation may include any number of dihedral corner reflector arrays. As the number of dihedral corner reflector arrays increases, the continuity of a floating image at switching between dihedral corner reflector arrays forming the image due to movement of the viewpoint becomes more natural and a problem caused by a single reflection by dihedral corner reflectors becomes more unlikely to occur.

The dihedral corner reflectors constituting each dihedral corner reflector array only need to have two mutually perpendicular reflecting surfaces. The reflecting surfaces may use a phenomenon such as reflection by edge faces or films made of a reflecting material such as a metal with mirror-grade finish or with mirror coating, or total internal reflection at a mirror-grade interface between transparent media with different refractive index.

Figure 10:
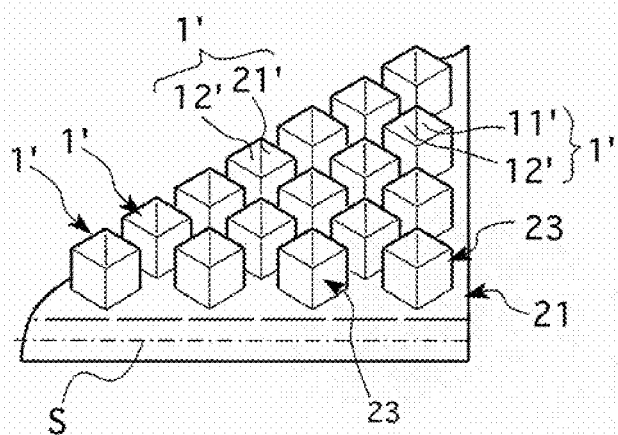
FIG. 10 is a perspective view of another example of the dihedral corner reflector array applied to the first embodiment.

More specifically, instead of dihedral corner reflectors formed by adjacent two inner walls of each square hole 22 provided in a thin plate substrate 21 in the dihedral corner reflector arrays of the embodiments and their variations described above, a dihedral corner reflector may be formed in each of transparent tubes 23 protruding in the direction of thickness of a substrate 21 and such tubes 23 may be arranged in a grid pattern to form a dihedral corner reflector array as illustrated in an enlarged view in FIG. 10. In this case, mutually perpendicular two of the inner wall surfaces of each tube 23 may be formed into specular surfaces 11' and 12' to form a dihedral corner reflector 1'. As in the embodiments described above, light reflected twice at the dihedral corner reflector 1' passes through a plane-symmetry point with respect to the surface of the substrate 21, that is, the optical device plane S', to form a three-dimensional or two-dimensional image in space opposite to the object to be projected across the optical device plane S'.

Unwanted reflections can be prevented to provide a clearer image by making the inner wall surfaces other than the specular surfaces 11' and 12' of each tube 23 non-specular or by tilting them with respect to the optical device plane S'. Furthermore, total reflection by the two specular surfaces 11' and 12' of each dihedral corner reflector 1' may be used or reflection by a mirror coating on the surfaces may be used. If total internal reflection by the specular surfaces 11' and 12' is used, multiple reflections will be less likely to occur because of the critical angle of the total reflection. Two surfaces of each tube that are to be used as specular surfaces may be coated with reflective metal and tubes may be bounded together. In that case, measures need to be taken to prevent multiple reflections by making the surfaces other than the specular surfaces non-specular; however, the aperture ratio will be improved, resulting in a dihedral corner reflector array with high light transmittance.

The two specular surfaces of the dihedral corner reflector may be spaced apart from each other instead of being in contact with each other, provided that mutually perpendicular reflecting surfaces can be formed. The shapes of the multi-viewpoint floating image display optical system and the dihedral corner reflector arrays may be determined freely. Such details of the components are not limited to the examples shown in the embodiments described above. Various modifications can be made to specific configurations of components of any of the embodiments.

Figure 11:
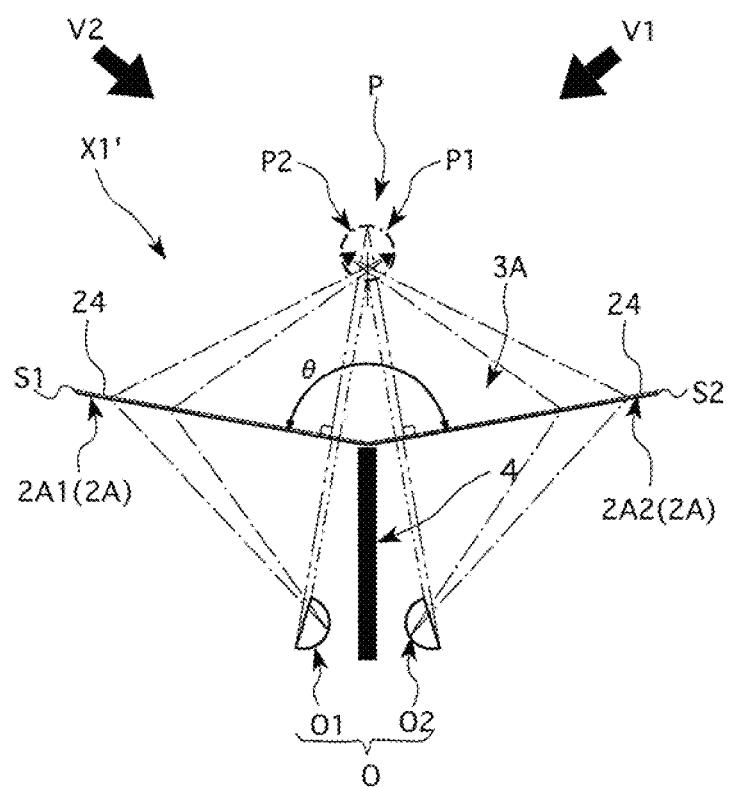
FIG. 11 is a side view illustrating an implementation in which a light blocking element is provided in the first embodiment.

As in the multi-viewpoint floating image display device X1' illustrated in FIG. 11, preferably a light blocking element, for example a light blocking plate 4, is provided between objects to be projected O1 and O2 in such a manner that the space under the two dihedral corner reflector arrays 2A1 and 2A2 is separated by the blocking element in order to allow light from one object to be projected O1 to pass only through the dihedral corner reflector array 2A1 corresponding to the object O1 to form an image in a plane-symmetric position with respect to the optical device plane S whereas to prevent the light from passing through the other dihedral corner reflector array 2A2 (ditto with the other object to be projected O2), as with the first embodiment. The provision of the blocking element (or a light blocking plate 4) can prevent formation and observation of an unintended image in an unintended position. Furthermore, an optical film 24 such as a light controlling film or viewing angle adjustment film is laminated on the top surface of each of the dihedral corner reflector arrays 2A1 and 2A2 as a light controlling means for transmitting light coming from a certain direction and blocking light coming from another certain direction, or diffusing light coming from a certain direction. Specifically, the optical film 24 prevents light traveling from objects to be projected O1 and O2 in the direction in which the light directly passes through the dihedral corner reflector arrays 2A1 and 2A2 from reaching the viewpoints V1 and V2. Thus, the objects to be projected O1 and O2 are prevented from being directly viewed from the viewpoints V1 and V2 through the dihedral corner reflector arrays 2A1 and 2A2 while transmitting only light that is reflected twice by the dihedral corner reflectors 1 and travels in the direction in which the light passes through the dihedral corner reflector arrays 2A1 and 2A2, thereby enabling only real images P1 and P2 of the objects to be projected O1 and O2 to be observed from the viewpoints V1 and V2, respectively.

Second Embodiment

Figure 12:
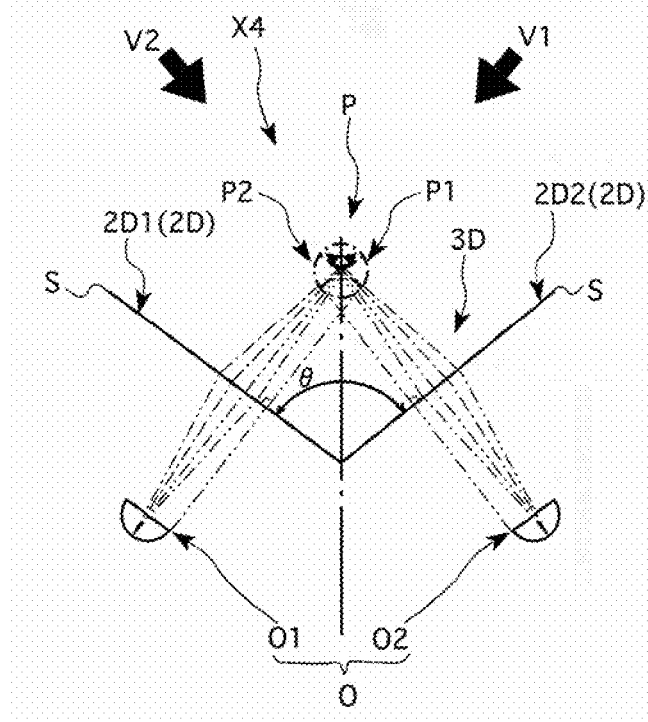
FIG. 12 is a side view schematically illustrating the multi-viewpoint floating image display optical system according to the second embodiment of the present invention.
Figure 13:
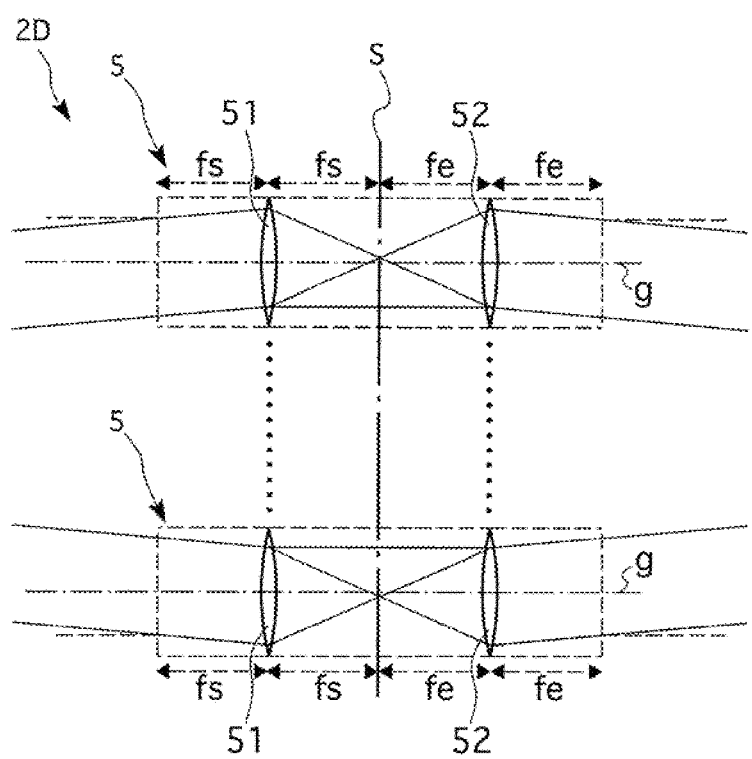
FIG. 13 is a side view schematically illustrating the afocal lens array applied to the second embodiment.

A second embodiment of the present invention will be described with reference to FIGS. 12 and 13. A multi-viewpoint floating image display device X4 according to the second embodiment includes a multi-viewpoint floating image display optical system 3D using two afocal lens arrays 2D (2D1 and 2D2) functioning as real mirror imaging optical systems. The two afocal lens arrays 2D1 and 2D2 constituting the multi-viewpoint floating image display optical system 3D are equivalent to each other (collectively denoted by 2D). A large number of afocal lenses 5 are arranged on a single optical device plane S as illustrated in FIG. 12. Each afocal lens 5 consists of two lenses 51 and 52 that share an optical axis "g" normal to the optical device plane S and are provided at a distance equal to the sum of their focal distances fs and fe from each other. In this example, both lenses 51 and 52 are convex lenses. Accordingly, light traveling from one side of the optical device plane S and entering the lenses 51 . . . exits the lenses 52 . . . on the other side and converges in a position plane-symmetric to the light source with respect to the optical device plane S. That is, if the light source is an object to be projected, an image of the object is formed in a position that is plane-symmetric to the object with respect to the optical device plane S. As illustrated in FIG. 12, the afocal lens arrays 2D1 and 2D2 are positioned so that their optical device planes S are at an angle less than 180 degrees with respect to each other to form a multi-viewpoint floating image display optical system 3D of the second embodiment. When afocal lens array 2D is used to form a real image of the object to be projected O in a position plane-symmetric to the object with respect to the optical device plane S, the viewing angle is limited to directions close to normal to the optical device plane S. Therefore, in order to form an image in a position not so far from the afocal lens array 2D, the angle between the optical device planes S, S on the real image side needs to be smaller as illustrated in FIG. 12 compared with that in the multi-viewpoint floating image display optical system 3A of the first embodiment.

In the present embodiment, when object to be projected O1 and O2 are placed in space on one side across the optical device planes S, S so as to correspond to the two afocal lens arrays 2D1 and 2D2, respectively, real mirror images P1 and P2 are formed in space on the opposite side and can be observed from viewpoints V1 and V2, respectively. As in the first embodiment, the real mirror images P1 and P2 can be combined in a region by appropriately adjusting the positions and orientations of the objects to be projected O1 and O2 with respect to the optical device planes S, S.

The multi-viewpoint floating image display optical system using the afocal lens arrays is not limited to the embodiment described above. Changes can be made to configurations and shapes and other specifics of the lenses and the lens arrays. A light blocking means described with respect to the first embodiment may be provided in space on the object side across the optical device plane. Furthermore, the multi-viewpoint floating image display optical system may be constructed so that an object is observable from three or more view points and may be used to construct a multi-viewpoint floating imaged display device.

Third Embodiment

Figure 14:
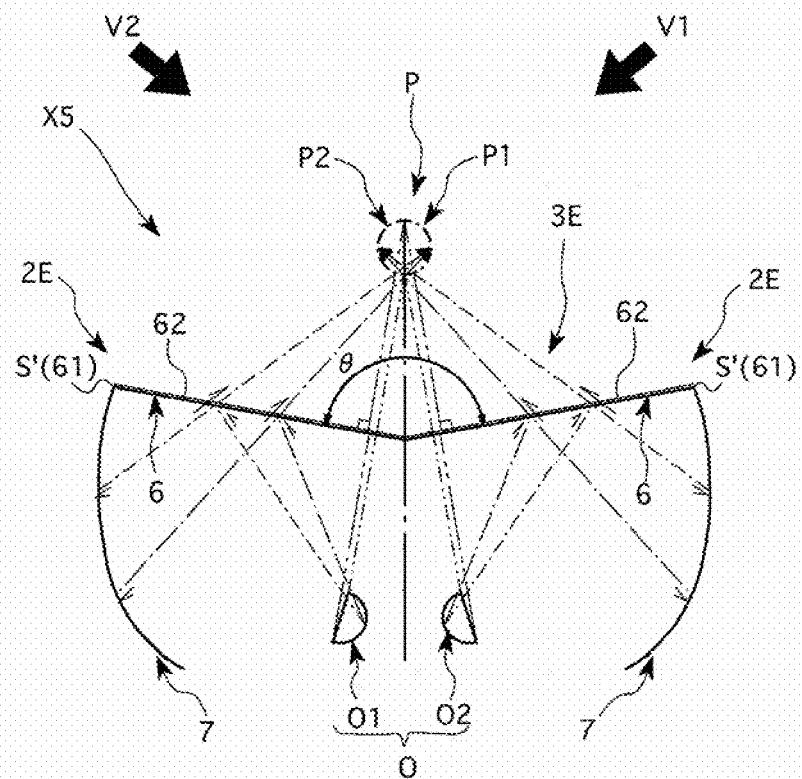
FIG. 14 is a side view schematically illustrating the multi-viewpoint floating image display optical system according to the third embodiment of the present invention.
Figure 15:
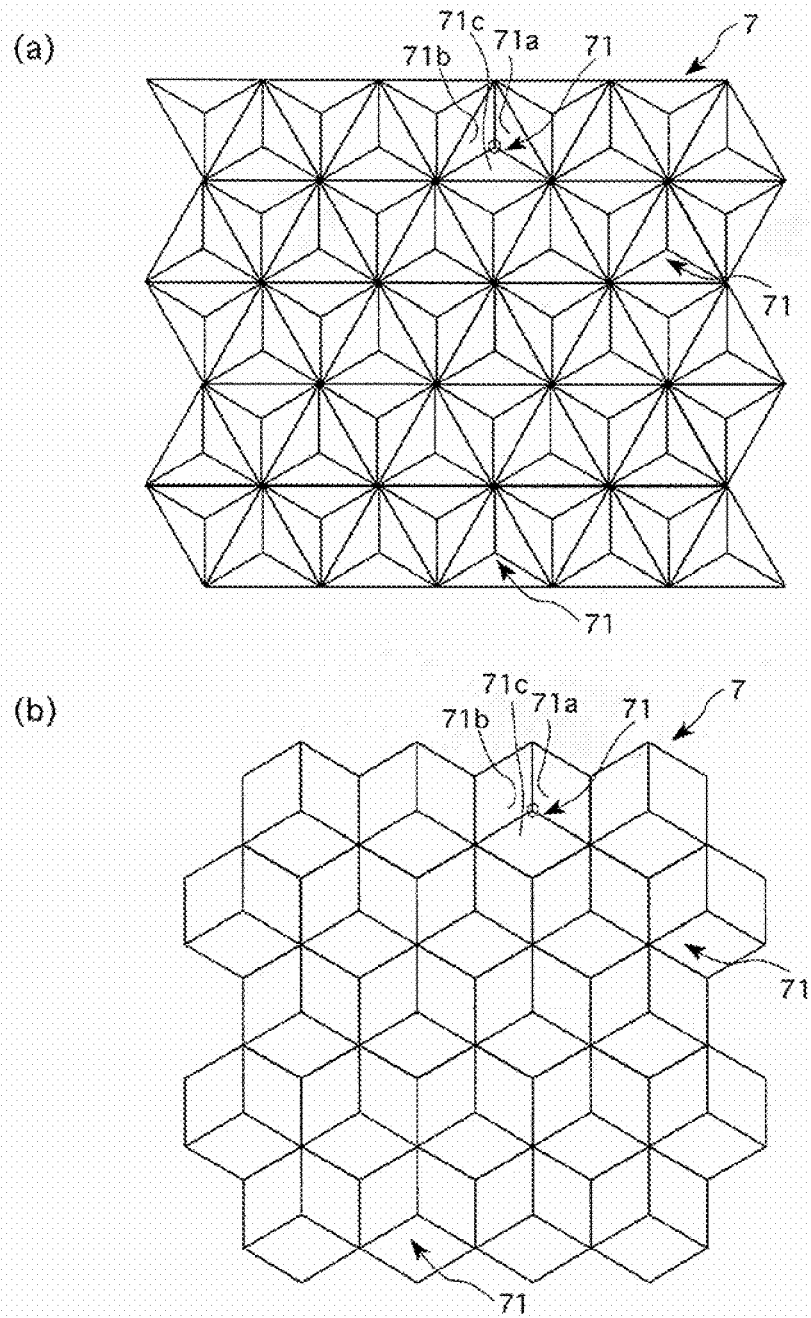
FIG. 15 is an enlarged front elevation view illustrating a part of the retroreflector array applied to the third embodiment.

A third embodiment of the present invention will be described with reference to FIGS. 14 and 15. A multi-viewpoint floating image display device X5 according to the third embodiment includes a multi-viewpoint floating image display optical system 3E using real mirror imaging optical systems 2E including half-mirrors 6 and retroreflector arrays 7. As illustrated in FIG. 14, in the real mirror imaging optical system 2E used in the present embodiment, light from an object to be projected O1 (or O2) placed in space on one side with respect to the symmetry surface S' which is the half-mirror surface 61 of the half-mirror 6 is reflected by the half-mirror surface 61 of the half-mirror 6, then retro-reflected by the retroreflector array 7 back to the incident direction, and passes through the half-mirror surface 61 to form a real image P1 (or P2) from a mirror image in a position symmetric to the object to be projected O1 (or O2) with respect to the half-mirror surface 61, which is the symmetry surface S'. In the multi-viewpoint floating image display optical system 3E used in the present embodiment, two such real mirror imaging optical systems 2E are used and positioned so that the two half-mirror surfaces 61, 61 which are the symmetry surfaces S' are at an angle less than 180 degrees on the real image P1, P2 sides.

The half-mirror 6 constituting each real mirror imaging optical system 2E may be a transparent thin plate made of a transparent resin or glass one surface of which is coated with a thin mirror coating. The other surface of the transparent thin plate is coated with an anti-reflective coating (AR coating) to prevent a duplex real mirror image P from being observed. An optical film 62 which is a light controlling means, such as light controlling film or a viewing angle adjustment film, that transmits light coming from a certain direction and blocking light coming from another certain direction, or diffuses light coming from a certain direction is laminated on the top surface of the half-mirror 6, which is on the real image side P. Specifically, the optical film 62 prevents light traveling from the objects to be projected O1, O2 and directly passing through the half-mirror 6 from reaching the view points V1, V2 to prevent the objects O1, O2 from being directly observed from the view points V1, V2 through the half-mirror 6 and while at the same time transmits light reflected by the half-mirror 6, which will be described later, then retro-reflected by the retroreflector array 7, and then passing through the half-mirror 6 to allow only real images P1, P2 of the objects O1, O2 to be observed from the viewpoints V1, V2.

The retroreflector arrays 7 may be of any type that precisely reflects incident light in the reverse direction. For example, the retroreflector arrays 7 may be ones that retro-reflect light by the surface of a base with mirror-grade finish or coated with a retro-reflective film or coating. The retroreflector arrays 7 may have a curved shape as depicted in FIG. 14 or may be a planer shape. For example, a retroreflector array 7 partially depicted in an enlarged view in FIG. 15(a) is a corner cube array including a set of corner cubes, each using one of the internal corners of a solid. Each retroreflector 71 includes three specular surfaces 71a, 71b and 71c which are three identical right isosceles triangles of the same size joined at one point and, when viewed from the front, form an equilateral triangle. These three specular surfaces 71a, 71b and 71c are mutually perpendicular and together form a corner cube. Light arriving at one of the specular surfaces (for example 71a) is reflected by the specular surface (71a) to another of the specular surfaces (71b, 71c), which in turn reflects the light back to the direction in which the light has entered the retroreflector 71. The retroreflector array 7 partially depicted in an enlarged view in FIG. 15(b) is also a corner cube array consisting of a set of corner cubes, each using one of the internal corners of a cube. Each retroreflector 71 includes three specular surfaces 71a, 71b and 71c which are three identical squares of the same size joined at one point and, when viewed from the front, form an equilateral hexagon. The three specular surfaces 71a, 71b and 71c are mutually perpendicular. While the retroreflector array 7 differs in shape from the retroreflector array 7 in FIG. 15(a), the principle of its retroreflection is the same as that of the retroreflector array 7 in FIG. 15(a). While strictly speaking the path of the incident light at the retroreflector array 7 and the path of the light exiting the retroreflector array 7 do not overlap each other but are in parallel, the paths can be considered as overlapping each other since the retroreflector 71 is considerably small compared with the retroreflector array 7. Differences between the two types of corner cube arrays are that the corner cube array having the right isosceles triangular specular surfaces is relatively easy to manufacture but has a somewhat lower reflectance and that the corner cube array having the square specular surfaces is somewhat difficult to manufacture but has a higher reflectance.

In addition to the corner cube arrays described above, the retroreflector arrays 7 may be one that uses three specular surfaces to retro-reflect light ("corner reflector" in a broad sense). Although not depicted, examples of unit retroreflector element 3 applicable to the present invention include a retroreflector in which two of the three specular surfaces are mutually perpendicular and the other is at an angle of 90/N degrees (where N is an integer) to the other two specular surfaces, and an acute-angled retroreflector in which the angels formed by adjacent ones of the three specular surfaces are 90, 60 and 45 degrees. A cat's eye retroreflector can also be used as a unit retroreflector element. These retroreflector arrays may be planer, bent or curved. While the retroreflector arrays 7 are located lateral to the objects to be projected O1 and O2 in the example in FIG. 14, the retroreflector arrays 7 can be placed in any positions where light coming from the objects to be projected O1 and O2 and reflected by the half-mirrors 6 can be retro-reflected.

The multi-viewpoint floating image display optical system is not limited to the embodiments described above. Changes can be made to configurations and shapes and other specifics of the half-mirrors and the retroreflector arrays. A light blocking means described with respect to the first embodiment may be provided in space on the object side across the optical device plane. Furthermore, the multi-viewpoint floating image display optical system may be constructed so that an object is observable from three or more view points.

Fourth Embodiment

One type of real mirror imaging optical system is used in each multi-viewpoint floating image display optical system in the embodiments described above. However, a multi-viewpoint floating image display optical system can include any combination of real mirror imaging optical systems using dihedral corner reflector arrays, real mirror imaging optical systems using afocal lens arrays, and a real mirror imaging optical systems using reflector arrays and half-mirrors, as appropriate.

Figure 16:
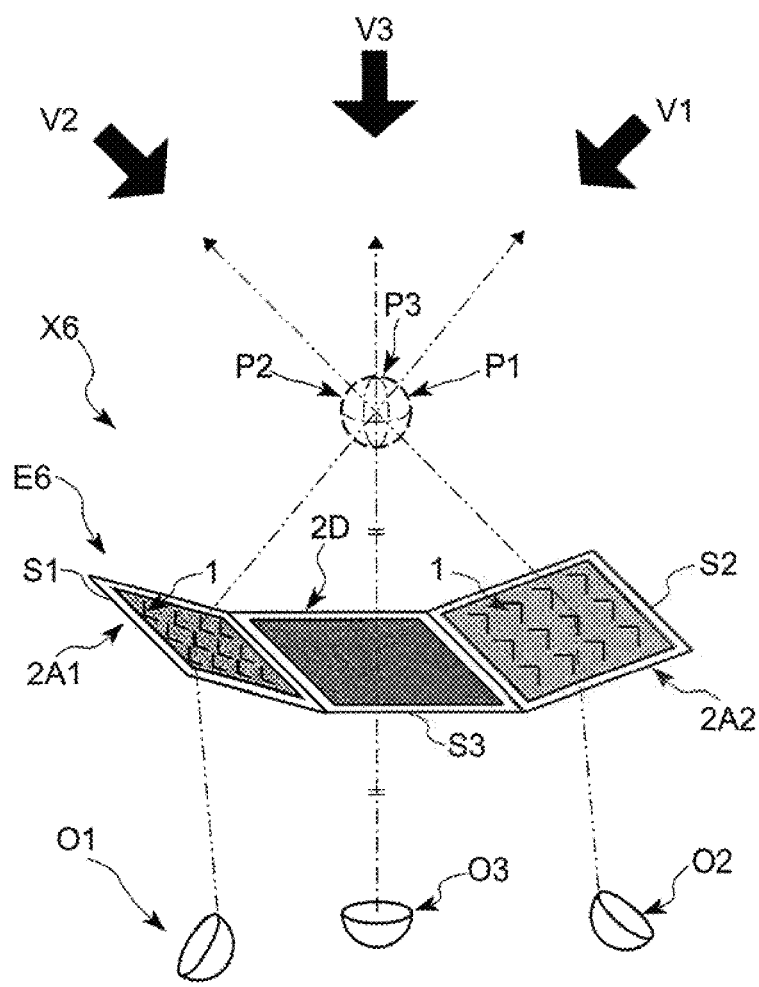
FIG. 16 is a perspective view schematically illustrating the multi-viewpoint floating image display optical system according to the fourth embodiment of the present invention.
Figure 17:
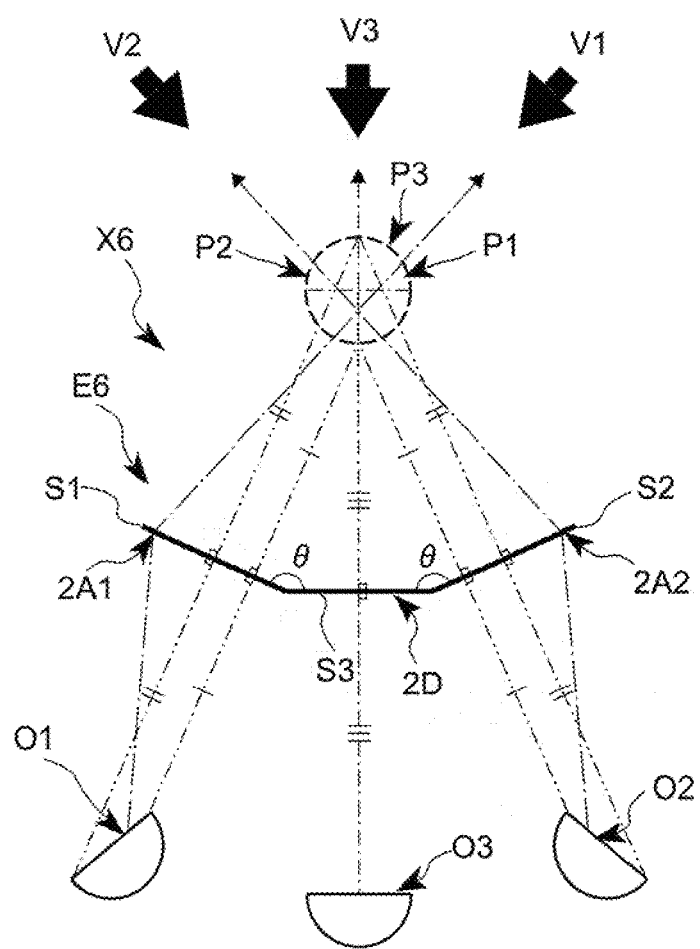
FIG. 17 is a side view schematically illustrating the multi-viewpoint floating image display optical system according to the fourth embodiment.

An example of a multi-viewpoint floating image display device including a multi-viewpoint floating image display optical system using more than one type of real mirror imaging optical system will be described below. A multi-viewpoint floating image display device X6 illustrated in FIGS. 16 and 17 includes a multi-viewpoint floating image display optical system 3F in which two dihedral corner reflector arrays 2A1 and 2A2, which are real mirror imaging optical systems used in the first embodiment, are located separately and an afocal lens array 2D, which is a real mirror imaging optical system used in the second embodiment, is provided between them. The angle θ formed by the symmetry planes of the adjacent real mirror imaging optical systems, that is, the optical device planes S1 and S3 which are the symmetry planes of the dihedral corner reflector array 2A1 and the afocal lens array 2D and the angle θ formed by the optical device planes S2 and S3 which are the symmetry planes of the dihedral corner reflector array 2A2 and the afocal lens array 2D are less than 180 degrees, respectively. Objects to be projected O1, O2 and O3 are placed correspondingly to the real mirror imaging optical systems 2A1, 2A2 and 2D, respectively. The real mirror imaging optical systems 2A1, 2A2 and 2D are positioned at angles with respect to each other and the objects to be projected O1, O2 and O3 are positioned, so that real mirror images P1, P2 and P3 of the objects to be projected O1, O2 and O3 are combined in one small region.

In this way, the multi-viewpoint floating image display device X6 of the present embodiment uses multiple real mirror imaging optical systems 2A1, 2A2 and 2D with different viewing angles with respect to the optical device planes so that real mirror images P1, P2 and P3 overlap one another, thereby enabling the real mirror images P1, P3 and P2 corresponding to three view points V1, V3 and V2 to be observed from the viewpoints V1, V3, and V2, respectively and also enabling the real mirror images P1, P3 and P2 to be continuously observed as an observer moves from one view point to another. By positioning the symmetry planes (optical device planes) of adjacent real mirror imaging optical systems at an angle θ of less than 180 degrees to each other as described above and changing the orientations of the symmetry planes and positions of the objects to be projected, the range of viewpoints can be extended in the vertical directions as well. Therefore, a multi-viewpoint floating image display optical system having a polyhedral shape, for example a nearly hemispherical shape, can be provided in the multi-viewpoint floating image display device by combining four or more real mirror imaging optical systems of the same or different types.

Fifth Embodiment

Figure 18:
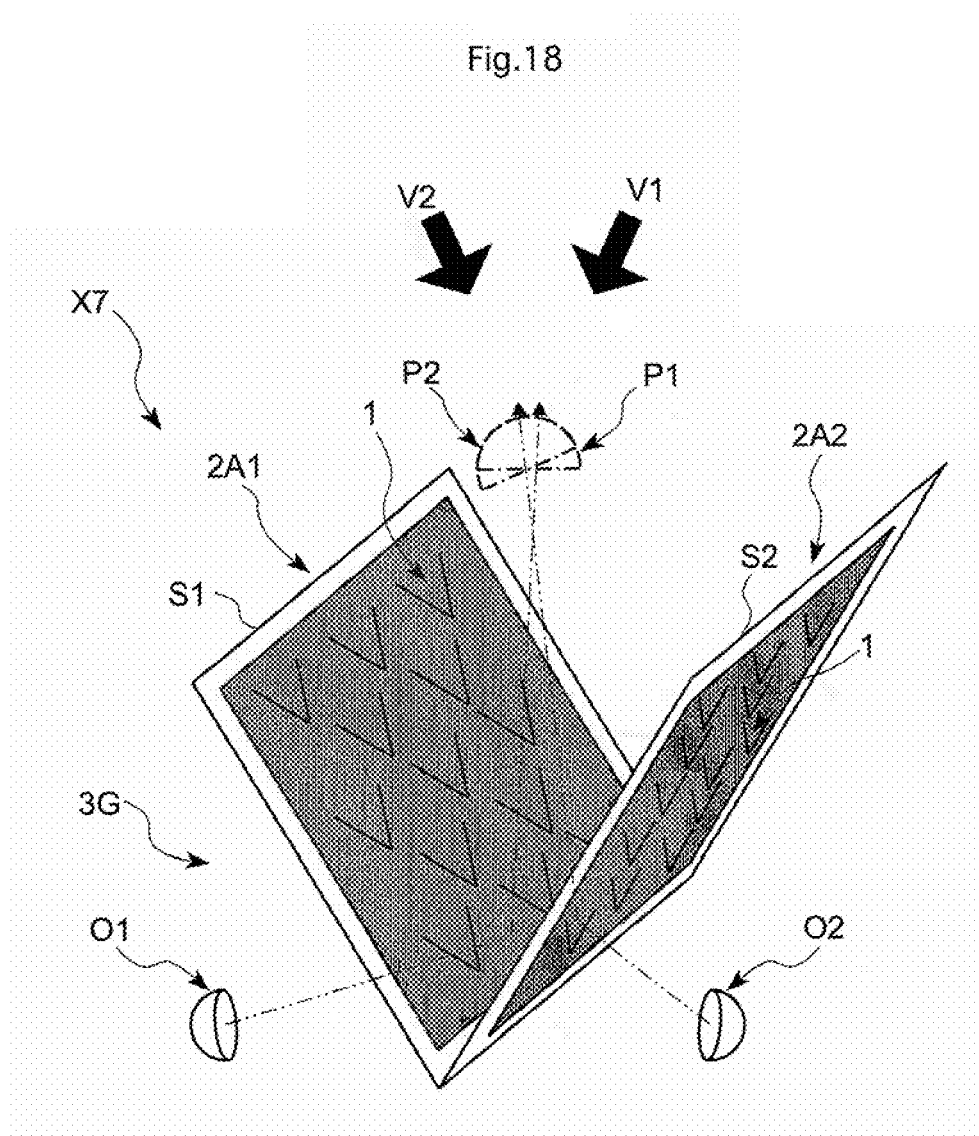
FIG. 18 is a perspective view schematically illustrating the multi-viewpoint floating image display optical system according to the fifth embodiment of the present invention.

Another illustrative configuration will be described that continuously switches from one real mirror image to another as the viewpoint moves, as in the fourth embodiment. For example, a multi-viewpoint floating image display device X7 illustrated in FIGS. 18 and 19 includes a multi-viewpoint floating image display optical system 3G in which dihedral corner reflectors 1 of two dihedral corner reflector arrays 2A1 and 2A2 used in the multi-viewpoint floating image display device X1 of the first embodiment are directed outward and the angle θ formed by the optical device planes S1 and S2 of the two dihedral corner reflector arrays 2A1 and 2A2 is decreased below the angle illustrated in FIG. 1, for example to approximately 90 degrees. Real mirror images P1 and P2 of objects to be projected O1 and O2, respectively, will be observable from viewpoints V1 and V2, respectively, above the central area of the multi-viewpoint floating image display optical system 3A (above the junction between the two dihedral corner reflector arrays 2A1 and 2A2). As the viewpoint changes from V1 to V2 (or from V2 to V1), the observable real mirror image can be seamlessly changed from P1 to P2 (or from P2 to P1). Furthermore, by constructing a multi-viewpoint floating image display optical system 3A of the multi-viewpoint floating image display device X7 in which the two corner reflector arrays 2A1 and 2A2 are set upright so that the optical device planes S1 and S2 are vertical as described above, the lateral (horizontal) viewing angle for the real mirror images P1 and P2 can be widened. Dihedral corner reflectors on S1 and S2 in the fourth embodiment can also be directed outward as in the fifth embodiment. In that case, continuous images can be observed as the viewpoint gradually moves from V1 to V3 to V2.

While the embodiments have been described with respect to a mode in which mirror images of multiple objects to be projected are combined in a small region and formed as a real image, the images do not necessarily need to be combined. Images observable from different viewpoints may be spaced apart from one another, of course. Specific configurations of other components of the present invention are not limited to those in the embodiments described above; variations can be made without departing from the spirit of the present invention.

INDUSTRIAL APPLICABILITY

The present invention can be applicable as a novel display device enabling a real image of an object to be projected to be observed from multiple viewpoints and enabling a three-dimensional image having a normal depth to be observed from multiple viewpoints.

I claim:

1. A multi-viewpoint floating image display device comprising:
a multi-viewpoint floating image display optical system including a plurality of real mirror imaging optical systems being capable of forming a real image of objects to be projected, in a plane-symmetric position symmetric to said objects to be projected with respect to symmetry planes so as to be geometrical planes, wherein
all of said real mirror imaging optical systems are so arranged that the angle formed by any of the symmetry planes is less than 180 degrees on the real image side with respect to the symmetry planes; and
said objects to be projected are so positioned as to correspond to the respective real mirror imaging optical systems.

2. A multi-viewpoint floating image display device according to claim 1, wherein at least one of said real mirror imaging optical systems is a dihedral corner reflector array in which a plurality of dihedral corner reflectors are arranged on a predetermined optical device plane, each of said dihedral corner reflectors including mutually perpendicular two specular surfaces normal to said optical device plane, and the optical device plane is said symmetry plane.

3. A multi-viewpoint floating image display device according to claim 2, wherein all of said plurality of dihedral corner reflectors on each of said optical device planes face in the same direction.

4. A multi-viewpoint floating image display device according to claim 2, wherein all of said plurality of dihedral corner reflectors on each of said optical device planes are directed to a predetermined point.

5. A multi-viewpoint floating image display device according to claim 2, wherein said dihedral corner reflector array comprises a set of a plurality of dihedral corner reflector arrays sharing an optical device plane.

6. A multi-viewpoint floating image display device according to claim 1, wherein at least one of said real mirror imaging optical systems is an afocal lens array in which a plurality of afocal lenses are arranged on a predetermined optical device planes so as to be symmetry planes said afocal lenses having optical axis which are perpendicular to said optical device planes.

7. A multi-viewpoint floating image display device according to claim 1, wherein at least one of said real mirror imaging optical systems comprises a retroreflector array which retroreflects light and a half-mirror having a half-mirror surface which reflects and transmits light; the half-mirror surface is said symmetry plane; and said retroreflector array is positioned in space on the same side as said object to be projected with respect to the half-mirror.

8. A multi-viewpoint floating image display device according to claim 1, wherein a blocking element is provided between said objects to be projected, said blocking element blocking light coming from one of the objects from reaching the symmetry plane that does not correspond to that object and block light coming from the other object from reaching the other symmetry plane.

9. A multi-viewpoint floating image display device according to claim 1, wherein an optical light controlling means for transmitting, blocking, or diffusing light coming from a certain direction is provided on a surface of the symmetry plane on the real image formation side; said light controlling means transmits only light that forms the image and blocks light coming from the direction in which the object to be projected would be directly viewed through the symmetry plane.

10. A multi-viewpoint floating image display device according to claim 1, wherein each of said objects to be projected is a portion of one solid which is reversed in depth, and each of said objects to be projected is positioned and related to said symmetry plane so that real images of said objects to be projected, viewed from different viewpoints, are combined to form the original solid.

11. A multi-viewpoint floating image display device according to claim 1, wherein the shape of each of said objects to be projected appears to change as the viewpoint moves, the multi-viewpoint floating image display device further comprising:
   a rotating means for rotating each of said objects to be projected; and
   an instantaneous visualizing means for instantaneously visualizing each of said objects to be projected in synchronization with rotation of the object by the rotating means as a static image of said object.

12. A multi-viewpoint floating image display device according to claim 1, wherein each of said objects to be projected is an image appearing on a curved surface.

13. A multi-viewpoint floating image display device, comprising:
   a first real mirror imaging optical system, that is capable of projecting a first real image of a first object in a first plane-symmetric position symmetric with respect to a first symmetry plane, and
   a second real mirror imaging optical system, that is capable of projecting a second real image of a second object in a second plane-symmetric position symmetric with respect to a second symmetry plane,
   wherein an angle formed between the first real mirror imaging optical system and the second real mirror imaging optical system is less than 180 degrees at a side of the first real image and the second real image; and
   wherein the first object and the second object are positioned to be opposed to the first real mirror imaging optical system and the second real mirror imaging optical system, respectively.

14. A multi-viewpoint floating image display device according to claim 13, wherein the first real mirror imaging optical system comprises a dihedral corner reflector array in which a plurality of dihedral corner reflectors are arranged on a predetermined optical device plane, each of said dihedral corner reflectors including mutually perpendicular two specular surfaces normal to said optical device plane, and the optical device plane is said first symmetry plane.

* * * * *